(12) United States Patent
O'Krafka et al.

(10) Patent No.: US 10,747,676 B2
(45) Date of Patent: Aug. 18, 2020

(54) MEMORY-EFFICIENT OBJECT ADDRESS MAPPING IN A TIERED DATA STRUCTURE

(71) Applicant: SanDisk Technologies LLC, Plano, TX (US)

(72) Inventors: Brian W. O'Krafka, Austin, TX (US); Frederic H. Tudor, Evanston, IL (US); Niranjan Patre Neelakanta, Bangalore (IN); Manavalan Krishnan, Fremont, CA (US); Johann George, Sunnyvale, CA (US); Evgeniy Firsov, Palo Alto, CA (US)

(73) Assignee: SanDisk Technologies LLC, Plano, TX (US)

( * ) Notice: Subject to any disclaimer, the term of this patent is extended or adjusted under 35 U.S.C. 154(b) by 0 days.

(21) Appl. No.: 15/208,531

(22) Filed: Jul. 12, 2016

(65) Prior Publication Data
US 2017/0242799 A1 Aug. 24, 2017

Related U.S. Application Data

(60) Provisional application No. 62/298,925, filed on Feb. 23, 2016.

(51) Int. Cl.
*G06F 12/00* (2006.01)
*G06F 12/10* (2016.01)
(Continued)

(52) U.S. Cl.
CPC .......... *G06F 12/10* (2013.01); *G06F 12/0292* (2013.01); *G06F 12/0802* (2013.01);
(Continued)

(58) Field of Classification Search
CPC .. G06F 12/10; G06F 12/0292; G06F 12/0802; G06F 2212/2022; G06F 2212/22; G06F 2212/65; G06F 2212/7202
See application file for complete search history.

(56) References Cited

U.S. PATENT DOCUMENTS 7,710,777 B1 5/2010 Montierth et al.
7,996,642 B1 8/2011 Smith
(Continued)

FOREIGN PATENT DOCUMENTS

WO WO 2015/047398 4/2015
WO WO 2015/152830 10/2015

OTHER PUBLICATIONS

Wilson's : "Working Draft SCSI Extended Copy Command," Apr. 2, 1999, http://wvvw.t10.org/ftp/t10/document.99/99-143r1.pdf, 34 pages.

(Continued)

*Primary Examiner* — John A Lane
(74) *Attorney, Agent, or Firm* — Morgan, Lewis & Bockius LLP

(57) ABSTRACT

Systems, methods and/or devices are used to perform memory-efficient mapping of block/object addresses. In one aspect, a method of managing a storage system having one or more storage devices includes a tiered data structure in which each node has a logical ID and entries in the nodes reference other nodes in the tiered data structure using the logical IDs. As a result, when a child node is updated and stored to a new location, but retains its logical ID, its parent node does not need to be updated, because the logical ID in the entry referencing the child node remains unchanged. Further, the storage system uses a secondary mapping table to translate the logical IDs to the corresponding physical locations of the corresponding nodes. Additionally, the secondary mapping table is cached in volatile memory, and as a result, the physical location of a required node is determined without accessing non-volatile memory.

21 Claims, 9 Drawing Sheets

(51) Int. Cl.
*G06F 12/02* (2006.01)
*G06F 12/0802* (2016.01)

(52) U.S. Cl.
CPC .. *G06F 2212/2022* (2013.01); *G06F 2212/22* (2013.01); *G06F 2212/65* (2013.01)

(56) References Cited

U.S. PATENT DOCUMENTS

| | | |
|---|---|---|
| 9,158,681 B1 | 10/2015 | Samuels et al. |
| 9,170,938 B1 | 10/2015 | Walsh et al. |
| 2003/0229627 A1 | 12/2003 | Carlson et al. |
| 2004/0167898 A1 | 8/2004 | Margolus et al. |
| 2006/0159109 A1 | 7/2006 | Lamkin et al. |
| 2007/0156842 A1 | 7/2007 | Vermeulen et al. |
| 2007/0174309 A1 | 7/2007 | Pettovello |
| 2007/0185902 A1 | 8/2007 | Messinger et al. |
| 2009/0012976 A1 | 1/2009 | Kang et al. |
| 2009/0119450 A1 | 5/2009 | Saeki et al. |
| 2011/0145512 A1 | 6/2011 | Adl-Tabatabai et al. |
| 2011/0252067 A1 | 10/2011 | Marathe et al. |
| 2012/0005419 A1 | 1/2012 | Wu et al. |
| 2012/0117328 A1 | 5/2012 | McKean et al. |
| 2012/0166360 A1 | 6/2012 | Shah et al. |
| 2012/0179645 A1 | 7/2012 | Lomet et al. |
| 2012/0259863 A1 | 10/2012 | Bodwin et al. |
| 2014/0075100 A1 | 3/2014 | Kaneko et al. |
| 2014/0185376 A1 | 7/2014 | Sinclair et al. |
| 2014/0189211 A1 | 7/2014 | George et al. |
| 2015/0212752 A1 | 7/2015 | Nemazie et al. |
| 2015/0242307 A1 | 8/2015 | Busaba et al. |
| 2015/0253999 A1 | 9/2015 | Nemazie et al. |
| 2015/0277794 A1 | 10/2015 | Tudor et al. |
| 2015/0278093 A1 | 10/2015 | O'Krafka et al. |
| 2015/0281389 A1 | 10/2015 | Firsov et al. |
| 2015/0370492 A1 | 12/2015 | Satnur et al. |
| 2015/0370701 A1 | 12/2015 | Higgins et al. |
| 2015/0378884 A1 | 12/2015 | Nemazie et al. |
| 2016/0034507 A1* | 2/2016 | Aron ................ G06F 17/30115 707/722 |
| 2016/0085464 A1 | 3/2016 | Tuers et al. |
| 2016/0132265 A1* | 5/2016 | Yi ........................ G06F 3/0683 711/105 |
| 2016/0299715 A1 | 10/2016 | Hashimoto et al. |
| 2016/0321010 A1 | 11/2016 | Hashimoto |
| 2016/0321294 A1* | 11/2016 | Wang ............... G06F 17/30194 |
| 2016/0335299 A1* | 11/2016 | Vemulapati ....... G06F 17/30327 |
| 2017/0075781 A1* | 3/2017 | Bennett, Jr. ........... G06F 3/0619 |
| 2017/0242785 A1 | 8/2017 | O'Krafka et al. |
| 2018/0349063 A1* | 12/2018 | Matsushita .......... G06F 3/0607 |

OTHER PUBLICATIONS

International Search Report and Written Opinion dated Mar. 15, 2017, received in International Patent Application No. PCT/US2016/067728, which corresponds to U.S. Appl. No. 15/208,540, 14 pages (O'Krafka).

International Search Report and Written Opinion dated Jun. 30, 2015, received in International Patent Application No. PCT/US2015/023927, which corresponds to U.S. Appl. No. 14/454,687, 11 pages (Kadayam).

International Search Report and Written Opinion dated Nov. 7, 2016, received in International Patent Application No. PCT/US2016/051717, which corresponds to U.S. Appl. No. 14/929,171, 13 pages (Shelton).

International Search Report and Written Opinion dated Sep. 14, 2016, received in International Patent Application No. PCT/US2016/036720, which corresponds to U.S. Appl. No. 15/144,704, 12 pages (Cheru).

* cited by examiner

Secondary Mapping Table 230

| Node Logical ID 237 | A | B | C | D | ... |
|---|---|---|---|---|---|
| Node Physical Location 239 | 5014 | 183 | 476 | 813 | ... |

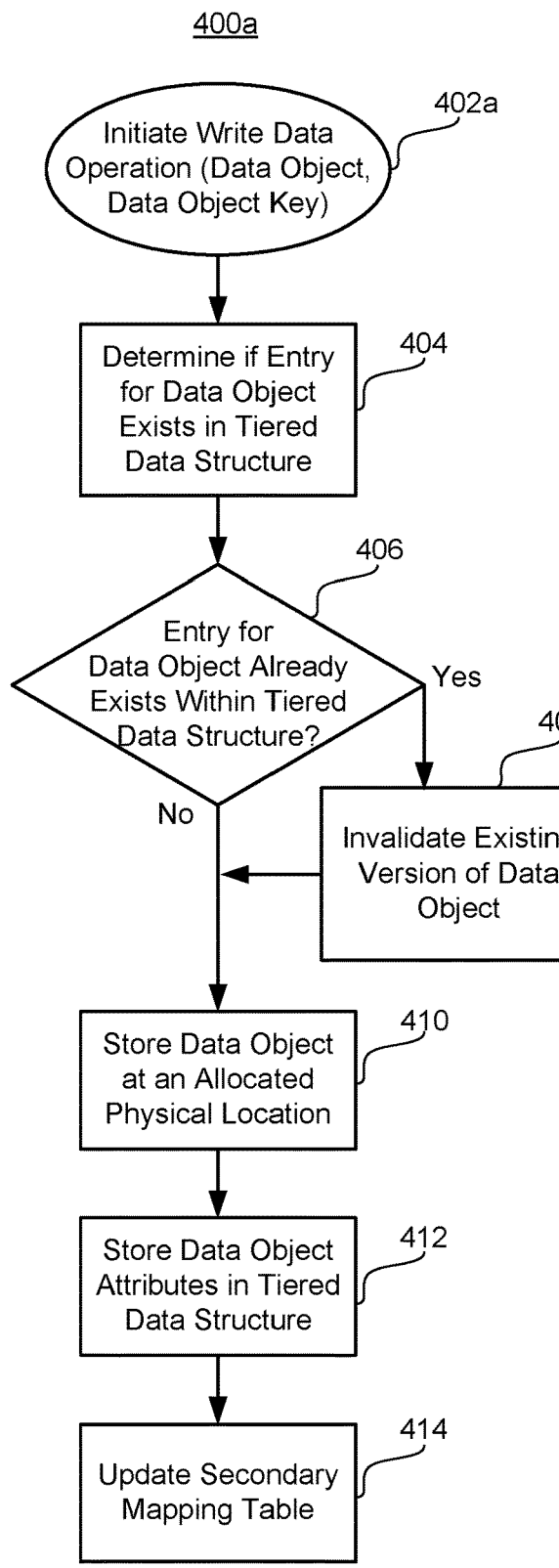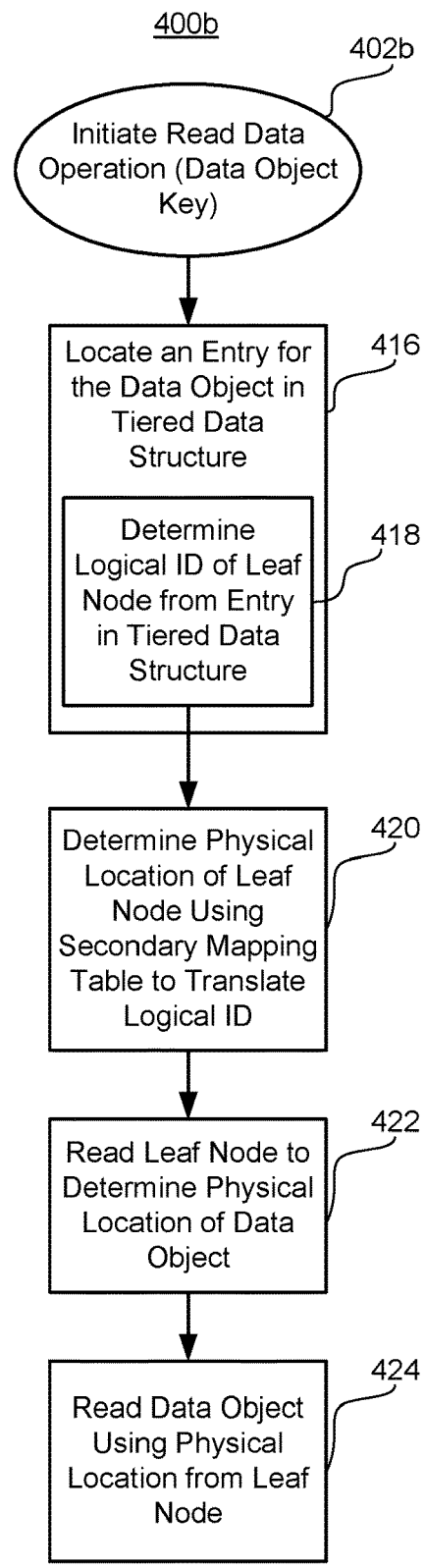
Figure 4A
Figure 4B

500

- Manage a storage system having a plurality of storage devices, including: — 502
  - Detect a first request to perform a read operation of a first data object stored in a storage device of the storage system, wherein the first request includes first key information corresponding to the first data object — 504
    - The storage device includes one or more flash memory devices — 506

- Locate a first entry for the first key information in a tiered data structure, wherein the first entry includes a logical ID for a leaf node corresponding to the first key information — 508
  - The tiered data structure includes a plurality of internal nodes and a plurality of leaf nodes — 510
    - Each leaf node of the plurality of leaf nodes corresponds to at least one data object — 512
      - A respective leaf node of the plurality of leaf nodes includes metadata for a corresponding data object — 514

- The plurality of internal nodes are cached in a volatile memory cache — 516
    - Obtain from a respective internal node of the tiered data structure a respective logical ID for another internal node of the tiered data structure that includes the first entry, and search the volatile memory cache for the another internal node of the tiered data structure using the respective logical ID — 518
    - Search the volatile memory cache for the logical ID for the leaf node, and upon confirming that the volatile memory cache does not have a cached node corresponding to the logical ID for the leaf node, use the secondary mapping table to determine the first physical location of the leaf node based on the logical ID for the leaf node — 520

Figure 5A

MEMORY-EFFICIENT OBJECT ADDRESS MAPPING IN A TIERED DATA STRUCTURE

RELATED APPLICATIONS

This application claims priority to U.S. Provisional Patent Application No. 62/298,925, filed Feb. 23, 2016, which is hereby incorporated by reference in its entirety.

TECHNICAL FIELD

The disclosed embodiments relate generally to memory systems, and in particular, to memory-efficient block/object address mapping in a storage device (e.g., comprising one or more flash memory devices).

BACKGROUND

Semiconductor memory devices, including flash memory, typically utilize memory cells to store data as an electrical value, such as an electrical charge or voltage. A flash memory cell, for example, includes a single transistor with a floating gate that is used to store a charge representative of a data value. Flash memory is a non-volatile data storage device that can be electrically erased and reprogrammed. More generally, non-volatile memory (e.g., flash memory, as well as other types of non-volatile memory implemented using any of a variety of technologies) retains stored information even when not powered, as opposed to volatile memory, which requires power to maintain the stored information. Increases in storage density have been facilitated in various ways, including increasing the density of memory cells on a chip enabled by manufacturing developments, and transitioning from single-level flash memory cells to multi-level flash memory cells, so that two or more bits can be stored by each flash memory cell.

The speed of many computer operations is frequently constrained by the speed and efficiency with which data can be stored and retrieved from data structures associated with a device. Many conventional data structures take a long time to store and retrieve data. However, tiered data structures can be used to dramatically improve the speed and efficiency of data storage. Some tiered data structures enable data searches, data insertions, data deletions, and sequential data access to be performed in logarithmic time. However, further improvements to tiered data structures can further increase the speed, efficiency, and reliability with which data can be stored and retrieved, thereby improving the performance of devices relying on such tiered data structures.

SUMMARY

Various embodiments of systems, methods and devices within the scope of the appended claims each have several aspects, no single one of which is solely responsible for the attributes described herein. Without limiting the scope of the appended claims, after considering this disclosure, and particularly after considering the section entitled "Detailed Description" one will understand how the aspects of various embodiments are used to perform memory-efficient mapping of block/object addresses. In one aspect, a method of managing a storage system having one or more storage devices includes a tiered data structure in which each node has a logical ID and entries in the nodes reference other nodes in the tiered data structure using the logical IDs. As a result, when a child node is updated and stored to a new location, but retains its logical ID, its parent node does not need to be updated, because the logical ID in the entry referencing the child node remains unchanged. Further, the storage system uses a secondary mapping table to translate the logical IDs to the corresponding physical locations of the corresponding nodes.

BRIEF DESCRIPTION OF THE DRAWINGS

So that the present disclosure can be understood in greater detail, a more particular description may be had by reference to the features of various embodiments, some of which are illustrated in the appended drawings. The appended drawings, however, merely illustrate pertinent features of the present disclosure and are therefore not to be considered limiting, for the description may admit to other effective features.

FIG. 4A is a conceptual flowchart of a memory-efficient write operation, in accordance with some embodiments.

FIG. 4B is a conceptual flowchart of a read operation compatible with the memory-efficient write operation of FIG. 4A, in accordance with some embodiments.

FIGS. 5A-5D illustrate a flowchart representation of a method of managing a storage system, in accordance with some embodiments.

Figure 1:
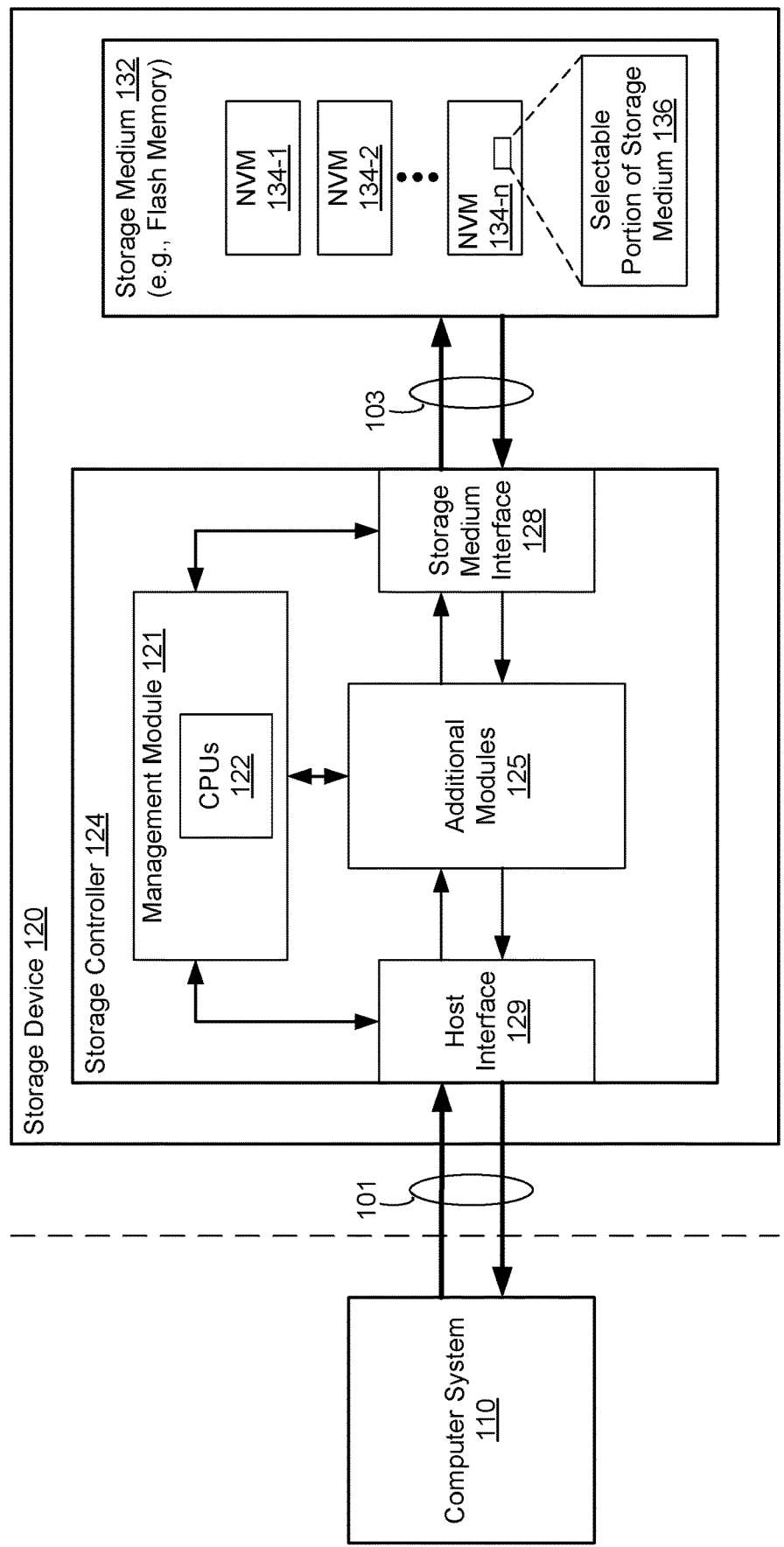
FIG. 1 is a block diagram illustrating an implementation of a data storage system, in accordance with some embodiments.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

Non-volatile memory systems are often used to store a database of information, such as a database in which data objects and their attributes are stored. The database is typically organized and stored as a tiered data structure, for example a tree data structure (e.g., a B-tree) having nodes in which data objects, pointers to the data objects, and attributes (sometimes called metadata) are stored. Tiered data structures can be used to dramatically improve the speed and efficiency of data storage. However, further improvements to tiered data structures can further increase the speed, efficiency, and reliability with which data can be stored and retrieved, thereby improving the performance of devices relying on such tiered data structures. The various embodiments described herein include systems, methods and/or devices used to improve performance of devices relying on tiered data structures by memory-efficient mapping of block/object addresses.

(A1) More specifically, some embodiments include a method of managing a storage system. In some embodiments, the method includes: (1) detecting a first request to perform a read operation of a first data object stored in a storage device of the storage system, wherein the first request includes first key information corresponding to the first data object, (2) locating a first entry for the first key information in a tiered data structure, wherein the first entry includes a logical ID for a leaf node corresponding to the first key information, (3) determining a first physical location of the leaf node based on the logical ID for the leaf node using a secondary mapping table, wherein the secondary mapping table is used to translate logical IDs for leaf nodes to physical locations of leaf node, (4) reading the leaf node using the first physical location to obtain a leaf node map entry, wherein the leaf node map entry includes size of the first data object and a second physical location of the first data object, and (5) reading from the second physical location to obtain the first data object.

(A2) In some embodiments of the method of A1, the tiered data structure includes a plurality of internal nodes and a plurality of leaf nodes.

(A3) In some embodiments of the method of A2, the plurality of internal nodes are cached in a volatile memory cache.

(A4) In some embodiments of the method of A3, locating the first entry for the first key information in the tiered data structure includes obtaining from a respective internal node of the tiered data structure a respective logical ID for another internal node of the tiered data structure that includes the first entry, and searching the volatile memory cache for the another internal node of the tiered data structure using the respective logical ID (A5) In some embodiments of the method of A3, determining the first physical location of the leaf node includes searching the volatile memory cache for the logical ID for the leaf node, and upon confirming that the volatile memory cache does not have a cached node corresponding to the logical ID for the leaf node, using the secondary mapping table to determine the first physical location of the leaf node based on the logical ID for the leaf node.

(A6) In some embodiments of the method of A2, each leaf node of the plurality of leaf nodes corresponds to at least one data object.

(A7) In some embodiments of the method of A6, a respective leaf node of the plurality of leaf nodes includes metadata for a corresponding data object.

(A8) In some embodiments of the method of any of A1 to A7, the secondary mapping table is stored in a dynamic random-access memory (DRAM).

(A9) In some embodiments of the method of any of A1 to A8, the method further includes: (1) detecting a second request to perform a write operation for a second data object to the storage device of the storage system, wherein the second request includes data to be written for the second data object and second key information corresponding to the second data object; and (2) determining whether a second entry for the second key information is in the tiered data structure. The method also includes, in accordance with a determination that the second entry for the second key information is not in the tiered data structure: (1) allocating space at a third physical location in the storage device for the data to be written for the second data object; (2) writing the data to be written for the second data object to the third physical location; and (3) inserting the second entry for the second key information in the tiered data structure, wherein the second entry includes size of the second data object and the third physical location. The method also includes, in accordance with a determination that the second entry for the second key information is in the tiered data structure: (1) invalidating data previously associated with the second data object; (2) allocating space at the third physical location in the storage device for the data to be written for the second data object; and (3) updating the second entry for the second key information in the tiered data structure to include the size of the second data object and the third physical location.

(A10) In some embodiments of the method of A9, the method further includes, concurrently with writing the data to be written for the second data object to the third physical location, updating a leaf node, in the tiered data structure, corresponding to the second data object to include metadata for the second data object.

(A11) In some embodiments of the method of any of A1 to A10, the method is controlled by a host that includes a client on behalf of which data is stored in the storage system.

(A12) In some embodiments of the method of any of A1 to A10, the method is controlled by a host that includes a storage system controller of the storage system.

(A13) In some embodiments of the method of any of A1 to A10, the method is controlled by a host that includes a cluster controller of the storage system.

(A14) In some embodiments of the method of any of A1 to A13, the storage device comprises one or more flash memory devices.

(A15) In another aspect, a host system includes an interface for operatively coupling to a storage system, one or more processors, and controller memory (e.g., non-volatile memory or volatile memory in or coupled to the controller) storing one or more programs. The one or more programs including instructions that when executed by the one or more processors cause the host system to perform operations including: (1) detecting a first request to perform a read operation of a first data object stored in a storage device of the storage system, wherein the first request includes first key information corresponding to the first data object, (2) locating a first entry for the first key information in a tiered data structure, wherein the first entry includes a logical ID for a leaf node corresponding to the first key information, (3) determining a first physical location of the leaf node based on the logical ID for the leaf node using a secondary mapping table, wherein the secondary mapping table is used to translate logical IDs for leaf nodes to physical locations of leaf nodes, (4) reading the leaf node using the first physical location to obtain a leaf node map entry, wherein the leaf node map entry includes size of the first data object and a second physical location of the first data object, and (5) reading from the second physical location to obtain the first data object.

(A16) In some embodiments of the host system of A15, the one or more programs include instructions that when executed by the one or more processors cause the host system to perform or control performance of any of the methods A2 to A14 described herein.

(A17) In yet another aspect, any of the methods A1 to A14 described above are performed by a host system including means for performing any of the methods described herein.

(A18) In yet another aspect, a storage system includes a storage medium (e.g., comprising one or more non-volatile storage devices, such as flash memory devices), one or more processors, and memory (e.g., non-volatile memory or volatile memory in the storage system) storing one or more programs, which when executed by the one or more processors cause the storage system to perform or control performance of any of the methods A1 to A14 described herein.

(A19) In yet another aspect, some embodiments include a non-transitory computer readable storage medium, storing one or more programs configured for execution by one or more processors of a storage device, the one or more programs including instructions for performing any of the methods described herein.

(A20) In yet another aspect, a storage system includes one or more storage devices, one or more subsystems having one or more processors, and memory storing one or more programs. The one or more programs including instructions that when executed by the one or more processors cause the storage system to perform operations including: (1) detecting a first request to perform a read operation of a first data object stored in a storage device of the storage system, wherein the first request includes first key information corresponding to the first data object, (2) locating a first entry for the first key information in a tiered data structure, wherein the first entry includes a logical ID for a leaf node corresponding to the first key information, (3) determining a first physical location of the leaf node based on the logical ID for the leaf node using a secondary mapping table, wherein the secondary mapping table is used to translate logical IDs for leaf nodes to physical locations of leaf nodes, (4) reading the leaf node using the first physical location to obtain a leaf node map entry, wherein the leaf node map entry includes size of the first data object and a second physical location of the first data object, and (5) reading from the second physical location to obtain the first data object.

(A21) In some embodiments of the storage system of A20, the one or more programs include instructions that when executed by the one or more processors cause the storage system to perform or control performance of any of the methods A2 to A14 described herein.

Numerous details are described herein in order to provide a thorough understanding of the example implementations illustrated in the accompanying drawings. However, some embodiments may be practiced without many of the specific details, and the scope of the claims is only limited by those features and aspects specifically recited in the claims. Furthermore, well-known methods, components, and circuits have not been described in exhaustive detail so as not to unnecessarily obscure more pertinent aspects of the implementations described herein.

FIG. 1 is a block diagram illustrating an implementation of a data storage system 100, in accordance with some embodiments. While some example features are illustrated, various other features have not been illustrated for the sake of brevity and so as not to obscure pertinent aspects of the example embodiments disclosed herein. To that end, as a non-limiting example, data storage system 100 includes a storage device 120 (also sometimes called an information storage device, or a data storage device, or a memory device), which includes a storage controller 124 and a storage medium 132, and is used in conjunction with or includes a computer system 110 (e.g., a host system or a host computer). In some embodiments, storage medium 132 is a single flash memory device while in other embodiments storage medium 132 includes a plurality of flash memory devices. In some embodiments, storage medium 132 is NAND-type flash memory or NOR-type flash memory. In some embodiments, storage medium 132 includes one or more three-dimensional (3D) memory devices. Further, in some embodiments, storage controller 124 is a solid-state drive (SSD) controller. However, other types of storage media may be included in accordance with aspects of a wide variety of embodiments (e.g., PCRAM, ReRAM, STT-RAM, etc.). In some embodiments, a flash memory device includes one or more flash memory die, one or more flash memory packages, one or more flash memory channels or the like. In some embodiments, data storage system 100 can contain one or more storage devices 120.

Computer system 110 is coupled to storage controller 124 through data connections 101. However, in some embodiments computer system 110 includes storage controller 124, or a portion of storage controller 124, as a component and/or as a subsystem. For example, in some embodiments, some or all of the functionality of storage controller 124 is implemented by software executed on computer system 110. Computer system 110 may be any suitable computer device, such as a computer, a laptop computer, a tablet device, a netbook, an internet kiosk, a personal digital assistant, a mobile phone, a smart phone, a gaming device, a computer server, or any other computing device. Computer system 110 is sometimes called a host, host system, client, or client system. In some embodiments, computer system 110 is a server system, such as a server system in a data center. In some embodiments, computer system 110 includes one or more processors, one or more types of memory, a display and/or other user interface components such as a keyboard, a touch-screen display, a mouse, a track-pad, a digital camera, and/or any number of supplemental I/O devices to add functionality to computer system 110. In some embodiments, computer system 110 does not have a display and other user interface components.

Storage medium 132 is coupled to storage controller 124 through connections 103. Connections 103 are sometimes called data connections, but typically convey commands in addition to data, and optionally convey metadata, error correction information and/or other information in addition to data values to be stored in storage medium 132 and data values read from storage medium 132. In some embodiments, however, storage controller 124 and storage medium 132 are included in the same device (i.e., an integrated device) as components thereof. Furthermore, in some embodiments, storage controller 124 and storage medium 132 are embedded in a host device (e.g., computer system 110), such as a mobile device, tablet, other computer or computer controlled device, and the methods described herein are performed, at least in part, by the embedded storage controller. Storage medium 132 may include any number (i.e., one or more) of memory devices (e.g., NVM 134-1, NVM 134-2 through NVM 134-$n$) including, without limitation, non-volatile semiconductor memory devices, such as flash memory device(s). For example, flash memory device(s) can be configured for enterprise storage suitable for applications such as cloud computing, for database applications, primary and/or secondary storage, or for caching data stored (or to be stored) in secondary storage, such as hard disk drives. Additionally and/or alternatively, flash memory device(s) can also be configured for relatively smaller-scale applications such as personal flash drives or hard-disk replacements for personal, laptop, and tablet computers.

Memory devices (NVM 134-1, NVM 134-2, etc.) of storage medium 132 include addressable and individually selectable blocks, such as selectable portion of storage medium 136 (also referred to herein as selected portion 136). In some embodiments, the individually selectable blocks (sometimes called erase blocks) are the minimum size erasable units in a flash memory device. In other words, each block contains the minimum number of memory cells that can be erased simultaneously. Each block is usually further divided into a plurality of pages and/or word lines, where each page or word line is typically an instance of the smallest individually accessible (readable and writable) portion in a block. In some embodiments (e.g., using some types of flash memory), the smallest individually accessible unit of a data set, however, is a sector, which is a subunit of a page. That is, a block includes a plurality of pages, each page contains a plurality of sectors, and each sector is the minimum unit of data for writing and reading data to and from the flash memory device.

In some embodiments, storage controller 124 includes a management module 121, a host interface 129, a storage medium interface 128, and additional module(s) 125. Storage controller 124 may include various additional features that have not been illustrated for the sake of brevity and so as not to obscure pertinent features of the example embodiments disclosed herein, and a different arrangement of features may be possible. Host interface 129 provides an interface to computer system 110 through data connections 101. Similarly, storage medium interface 128 provides an interface to storage medium 132 though connections 103. In some embodiments, storage medium interface 128 includes read and write circuitry, including circuitry capable of providing reading signals to storage medium 132 (e.g., reading threshold voltages for NAND-type flash memory).

In some embodiments, management module 121 includes one or more processing units 122 (also sometimes called processors, hardware processors, CPUs or the like) configured to execute instructions in one or more programs (e.g., in management module 121). In some embodiments, the one or more CPUs 122 are shared by one or more components within, and in some cases, beyond the function of storage controller 124. Management module 121 is coupled to host interface 129, additional module(s) 125 and storage medium interface 128 in order to coordinate the operation of these components. In some embodiments, one or more modules of management module 121 are implemented in computer system 110, as discussed in more detail below.

Additional module(s) 125 are coupled to storage medium interface 128, host interface 129, and management module 121. As an example, additional module(s) 125 may include an error control module to limit the number of uncorrectable errors inadvertently introduced into data during writes to memory or reads from memory. In some embodiments, an error control module, included in additional module(s) 125, includes an encoder and a decoder. In some embodiments, additional module(s) 125 are executed in software by the one or more CPUs 122 of management module 121, and, in other embodiments, additional module(s) 125 are implemented in whole or in part using special purpose circuitry (e.g., to perform encoding and decoding functions). In some embodiments, additional module(s) 125 are implemented in whole or in part by software executed on computer system 110.

In some embodiments, a write operation is initiated when computer system (host) 110 sends one or more host write commands (e.g., via data connections 101, or alternatively a separate control line or bus) to storage controller 124. In response, storage controller 124 sends one or more write access commands to storage medium 132, from storage medium interface 128 (e.g., via data connections 103, or alternatively a separate control line or bus), to write data to physical memory locations (addresses) within storage medium 132.

In some embodiments, during a write operation, host interface 129 receives data to be stored in storage medium 132 from computer system 110. The data received by host interface 129 is made available to an encoder (e.g., in additional module(s) 125), which encodes the data.

In some embodiments, a read operation is initiated when computer system (host) 110 sends one or more host read commands (e.g., via data connections 101, or alternatively a separate control line or bus) to storage controller 124 requesting data from storage medium 132. Storage controller 124 sends one or more read access commands to storage medium 132, from storage medium interface 128 (e.g., via data connections 103, or alternatively a separate control line or bus), to obtain raw read data in accordance with physical memory locations (addresses) within storage medium 132.

In some embodiments, storage medium interface 128 provides the raw read data to a decoder (e.g., in additional module(s) 125). If the decoding is successful, the decoded data is provided to host interface 129, where the decoded data is made available to computer system 110, or is provided to computer system 110 as a response to the host read command. In some embodiments, if the decoding is not successful, storage controller 124 may resort to a number of remedial actions or provide an indication of an irresolvable error condition.

As explained above, a storage medium (e.g., storage medium 132) is divided into a number of addressable and individually selectable blocks and each block is optionally (but typically) further divided into a plurality of pages and/or word lines and/or sectors. While erasure of a storage medium is performed on a block basis, in many embodiments, reading and programming of the storage medium is performed on a smaller subunit of a block (e.g., on a page basis, word line basis, or sector basis). In some embodiments, the smaller subunit of a block consists of multiple memory cells (e.g., single-level cells (SLC) or multi-level cells (MLC)). In some embodiments, programming is performed on an entire page.

As an example, if data is written to a storage medium in pages, but the storage medium is erased in blocks, pages in the storage medium may contain invalid (e.g., stale) data, but those pages cannot be overwritten until the whole block containing those pages is erased. In order to write to the pages with invalid data, the pages with valid data in that block are read and re-written to a new block and the old block is erased (or put on a queue for erasing). This process is called garbage collection. After garbage collection, the new block contains pages with valid data and free pages that are available for new data to be written, and the old block that was erased is also available for new data to be written. Since flash memory can only be programmed and erased a limited number of times, the efficiency of the algorithm used to pick the next block(s) to re-write and erase has a significant impact on the lifetime and reliability of flash-based storage systems.

Write amplification is a phenomenon where the actual amount of physical data written to a storage medium (e.g., storage medium 132) is a multiple of the logical amount of data intended to be written by a host (e.g., computer system 110, sometimes called a host). As discussed above, when a storage medium must be erased before it can be re-written, the garbage collection process to perform these operations results in re-writing data one or more times. This multiplying effect increases the number of writes required over the life of a storage medium, which shortens the time it can reliably operate. The formula to calculate the write amplification of a storage system is given by equation (1):

$$\text{amount of data written to a storage medium/amount of data written by a host} \qquad (1)$$

One of the goals of any storage system architecture is to reduce write amplification as much as possible so that available endurance is used to meet storage medium reliability and warranty specifications. Higher system endurance also results in lower cost as the storage system may need less over-provisioning. By reducing the write amplification, the endurance of the storage medium is increased and the overall cost of the storage system is decreased. Generally, garbage collection is performed on erase blocks with the fewest number of valid pages for best performance and best write amplification. However, since different erase blocks have different wear characteristics, it is important to use erase blocks based on how much life a respective erase block has left, rather than simply the number of program-erase cycles performed on the respective erase block thus far. As described below, in some implementations, garbage collection that is performed based on characteristics of erase blocks (e.g., an age metric) helps to improve wear leveling, thus extending the life of the memory device.

Figure 2A:
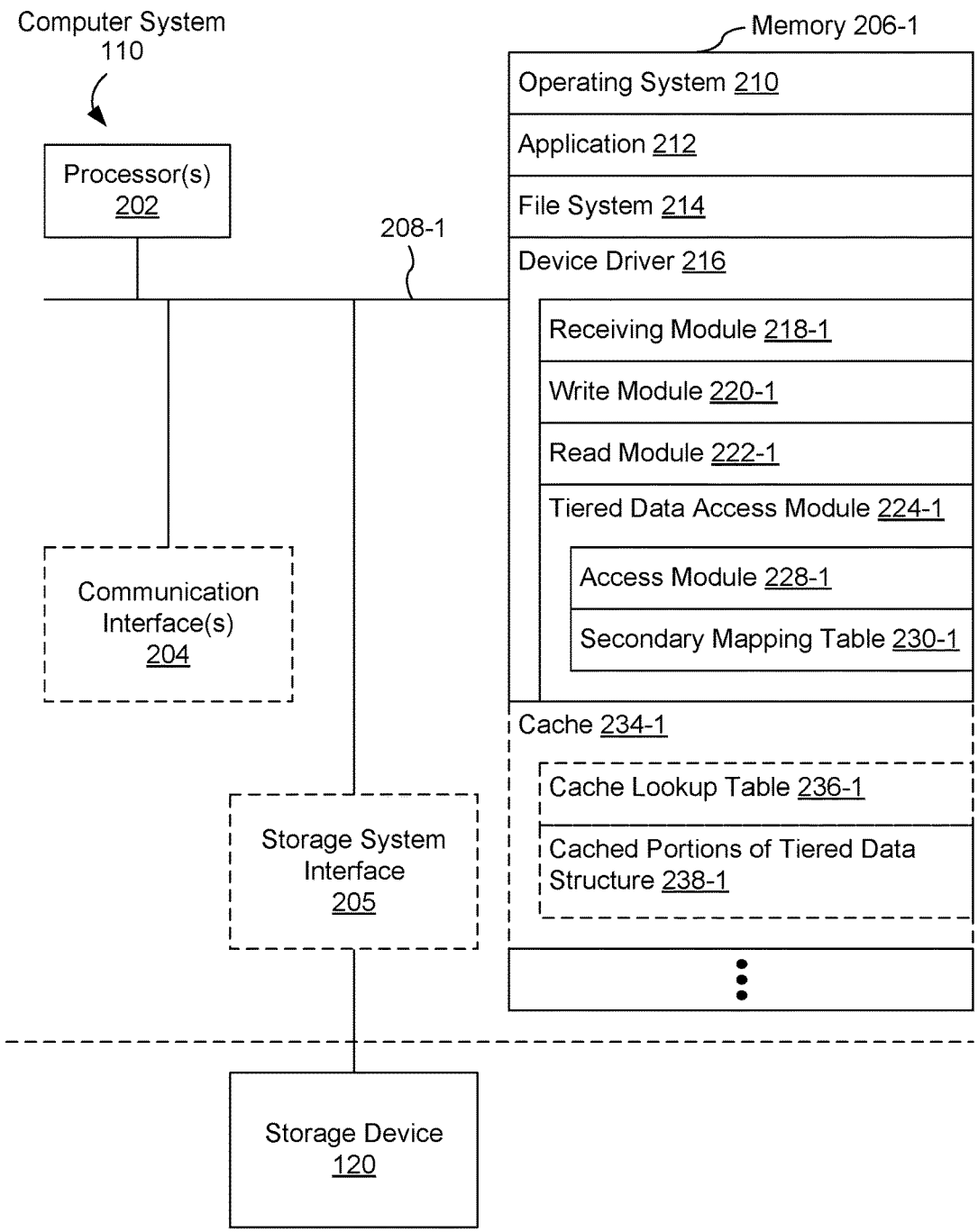
FIG. 2A is a block diagram illustrating a host computing device, in accordance with some embodiments.

FIG. 2A is a block diagram illustrating an implementation of a computer system 110, in accordance with some embodiments. Computer system 110 typically includes one or more processors 202 (also sometimes called CPUs, processing units, hardware processors, microprocessors or microcontrollers) for executing modules, programs and/or instructions stored in memory 206-1 and thereby performing processing operations, memory 206-1, and one or more communication buses 208-1 for interconnecting these components. Communication buses 208-1 optionally include circuitry (sometimes called a chipset) that interconnects and controls communications between system components. In some embodiments, such as those represented by FIG. 1, computer system 110 is coupled to storage device 120 by communication buses 208-1 and a storage system interface 205. In some embodiments, computer system 110, includes one or more communication interfaces 204 for coupling computer system 110 to other systems (not shown), e.g., via a communications network such as the internet, an intranet, or local area network, or the like.

Memory 206-1 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. Memory 206-1 optionally includes one or more storage devices remotely located from processor(s) 202. Memory 206-1, or alternately the non-volatile memory device(s) within memory 206-1, comprises a non-transitory computer readable storage medium. In some embodiments, memory 206-1, or the computer readable storage medium of memory 206-1 stores the following programs, modules, and data structures, or a subset thereof:
- an operating system 210, which includes procedures for handling various basic system services and for performing hardware dependent tasks;
- an application 212;
- a file system 214;
- a device driver 216 for accessing storage device 120, including:
  - a receiving module 218-1 used for receiving host access commands;
  - a write module 220-1 used for writing data to storage device 120;
  - a read module 222-1 used for reading data from storage device 120;
  - a tiered data structure access module 224-1 used for accessing a tiered data structure (e.g., tiered data structure 300, FIG. 3, which may be stored in storage medium 132 of storage device 120), including:
    - an access module 228-1 used for accessing nodes within the tiered data structure
    - a secondary mapping table 230-1 used for translating logical IDs of leaf nodes to physical locations of leaf nodes;
  - a cache 234-1 for caching mapping data, including:
    - a cache lookup table 236-1 for locating nodes of a tiered data structure stored (i.e., cached) in cache 234-1; and
    - cached portions 238-1 of a tiered data structure (e.g., tiered data structure 300, FIG. 3) that is stored in the non-volatile storage medium of storage device 120.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 206-1 may store a subset of the modules and data structures identified above. Furthermore, memory 206-1 may store additional modules and data structures not described above. In some embodiments, the programs, modules, and data structures stored in memory 206-1, or the computer readable storage medium of memory 206-1, provide instructions for implementing respective operations in the methods described below with reference to FIGS. 3, 4A-4B, and 5A-5D.

Although FIG. 2A shows computer system 110 in accordance with some embodiments, FIG. 2A is intended more as a functional description of the various features which may be present in computer system 110 than as a structural schematic of the embodiments described herein. In practice, and as recognized by those of ordinary skill in the art, the programs, modules, and data structures shown separately could be combined and some programs, modules, and data structures could be separated.

Figures 2B, 2C:
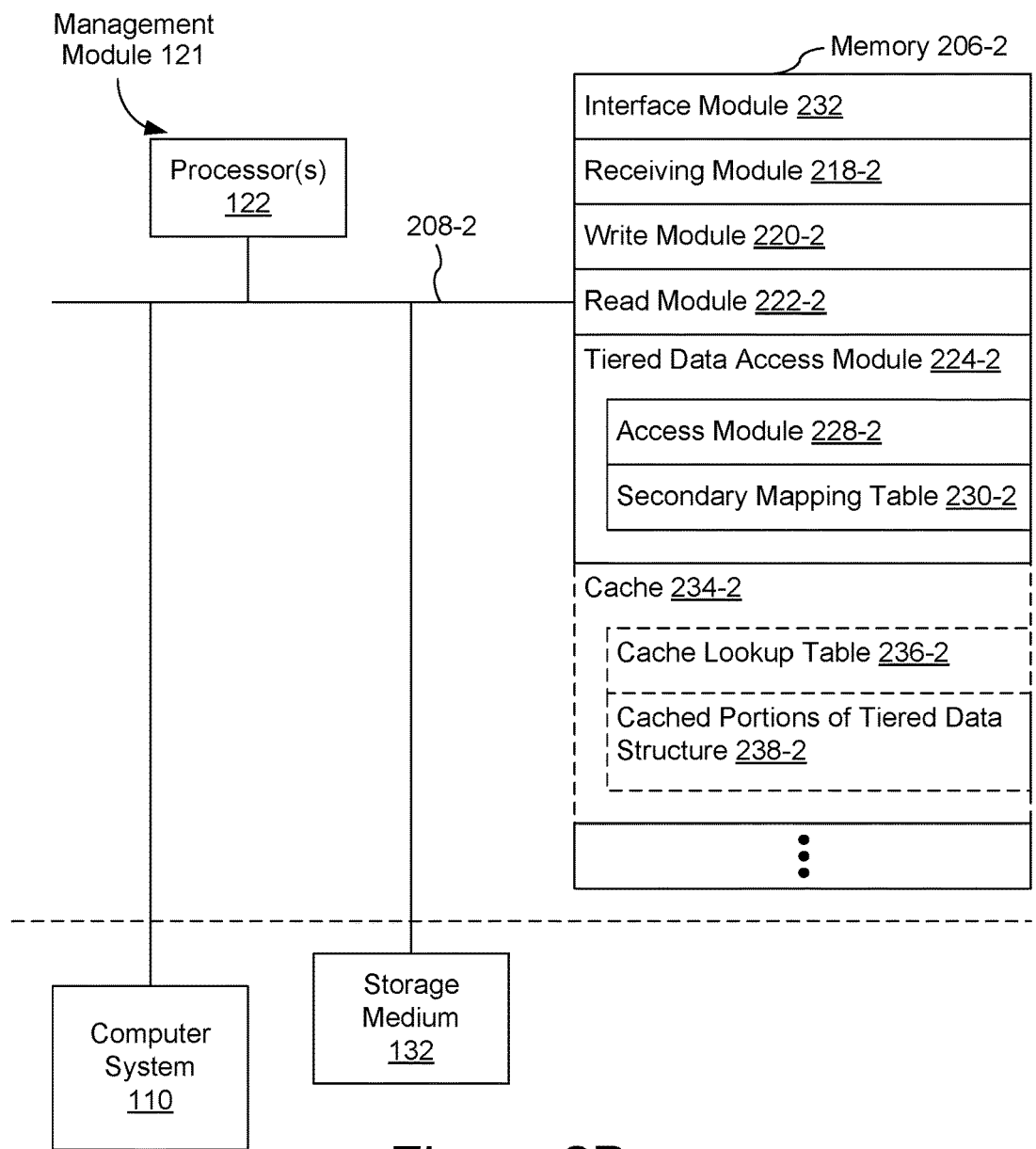
FIG. 2B is a block diagram illustrating a memory management module of a non-volatile memory controller, in accordance with some embodiments.
FIG. 2C is a diagram illustrating a secondary mapping table included in FIGS. 2A and 2B in accordance with some embodiments.

FIG. 2B is a block diagram illustrating an implementation of a management module 121, in accordance with some embodiments. Management module 121 typically includes one or more processors 122 (also sometimes called CPUs, processing units, hardware processors, microprocessors or microcontrollers) for executing modules, programs and/or instructions stored in memory 206-2 and thereby performing processing operations, memory 206-2, and one or more communication buses 208-2 for interconnecting these components. Communication buses 208-2 optionally include circuitry (sometimes called a chipset) that interconnects and controls communications between system components. In some embodiments, such as those represented by FIG. 1, management module 121 is coupled to computer system 110 and storage medium 132 by communication buses 208-2. Memory 206-2 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. Memory 206-2 optionally includes one or more storage devices remotely located from processor(s) 122. Memory 206-2, or alternately the non-volatile memory device(s) within memory 206-2, comprises a non-transitory computer readable storage medium. In some embodiments, memory 206-2, or the computer readable storage medium of memory 206-2 stores the following programs, modules, and data structures, or a subset thereof:

- an interface module 232 that is used for communicating with other components, such as non-volatile memory devices 134;
- a receiving module 218-2 for receiving host access commands;
- a write module 220-2 used for writing to non-volatile memory devices 134;
- a read module 222-2 used for reading from non-volatile memory devices 134;
- a tiered data structure access module 224-2 used for accessing a tiered data structure (e.g., tiered data structure 300, FIG. 3, which may be stored in storage medium 132 of storage device 120), including:
  - an access module 228-2 used for accessing nodes within a tiered data structure;
  - a secondary mapping table 230-2 used for translating logical IDs of leaf nodes to physical locations of leaf nodes;
- a cache 234-2 for caching mapping data, including:
  - a cache lookup table 236-2 for locating nodes of a tiered data structure stored (i.e., cached) in cache 234-2; and
  - cached portions 238-2 of a tiered data structure (e.g., tiered data structure 300, FIG. 3) that is stored in the non-volatile storage medium of storage device 120.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 206-2 may store a subset of the modules and data structures identified above. Furthermore, memory 206-2 may store additional modules and data structures not described above. In some embodiments, the programs, modules, and data structures stored in memory 206-2, or the computer readable storage medium of memory 206-2, provide instructions for implementing respective operations in the methods described below with reference to FIGS. 3, 4A-4B, and 5A-5D.

Although FIG. 2B shows management module 121 in accordance with some embodiments, FIG. 2B is intended more as a functional description of the various features which may be present in management module 121 than as a structural schematic of the embodiments described herein. In practice, and as recognized by those of ordinary skill in the art, the programs, modules, and data structures shown separately could be combined and some programs, modules, and data structures could be separated.

FIG. 2C is a diagram illustrating a secondary mapping table 230 included in FIGS. 2A and 2B, in accordance with some embodiments. In some embodiments, secondary mapping table 230 is used for translating logical IDs 237 of nodes of a tiered data structure to the corresponding physical locations 239 of the corresponding nodes. For example, as shown in FIG. 2C, node logical ID "A" is translated to node physical location "5014," and similarly node logical ID "B" is translated to node physical location "183." In some embodiments, secondary mapping table 230 is a hash table that has an associated hash function that hashes a key (e.g., logical ID of a node in a tiered data structure) to a corresponding value (e.g., physical location of a node in a tiered data structure). For example, the hash function in FIG. 2C would hash key "A," to value "5014." Alternately, in some embodiments, secondary mapping table 230 may be organized in any manner that facilitates efficient lookup operations, e.g., binary tree, content addressable memory, or the like.

Figure 3:
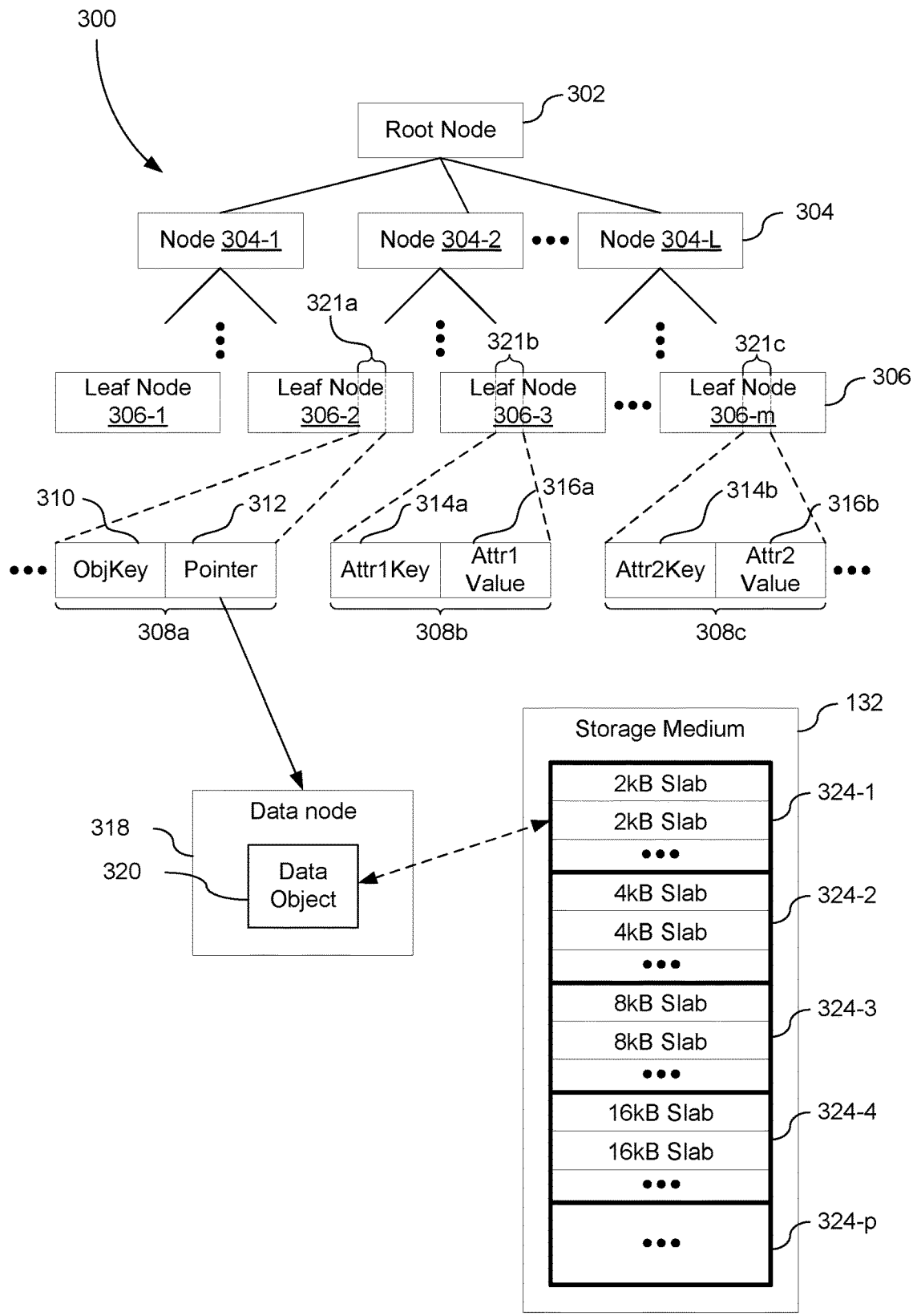
FIG. 3 is a conceptual diagram of a tiered data structure, in accordance with some embodiments.
Figure 5B:
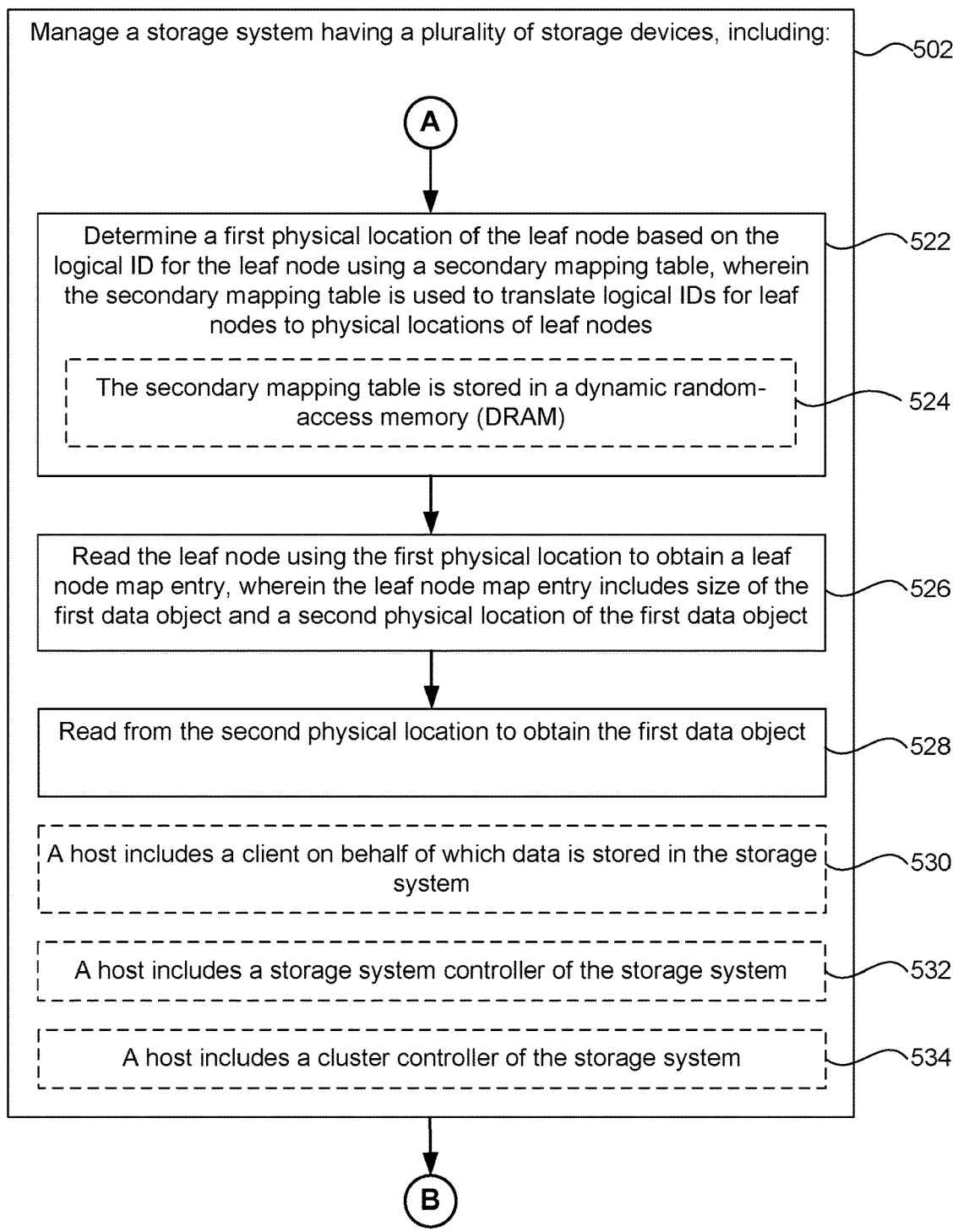
Figure 5C:
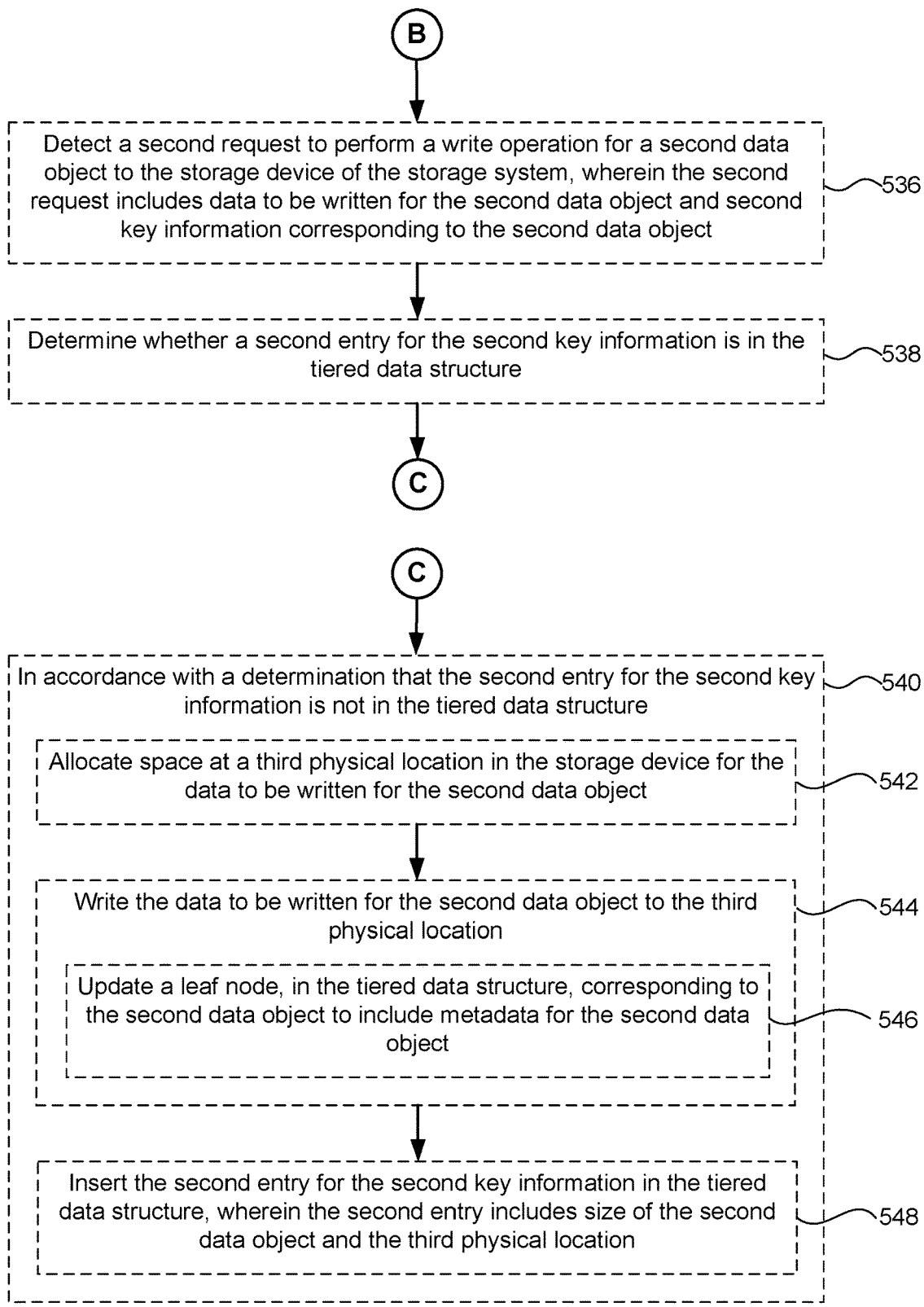
Figure 5D:
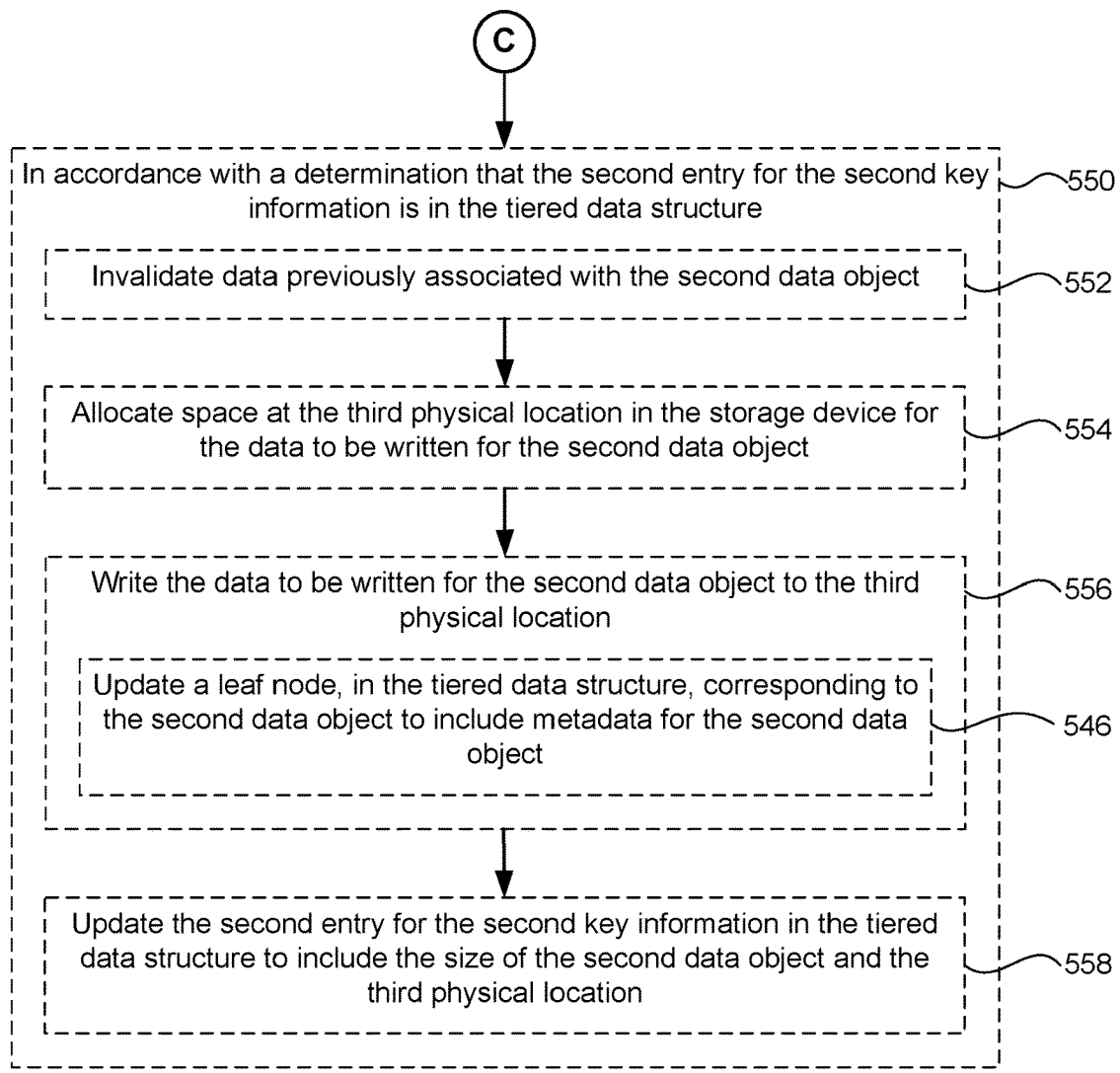

FIG. 3 is a simplified, conceptual diagram of a tiered data structure 300 (e.g., a B-tree), a type of data structure that is commonly used in databases and file systems. The root node 302 is the highest point within the tiered data structure 300 and serves as the parent node for all other nodes within the tiered data structure (i.e., the root node has a node depth of zero). In some embodiments, beneath the root node 302 are internal (non-leaf) nodes 304 (e.g., Nodes 304-1-304-L) and leaf nodes 306 (e.g., Leaf Nodes 306-1-306-m). Internal nodes 304 may have a variable number of child nodes. Furthermore, each leaf node and internal node other than root node 302 has a parent node containing entries that point to or otherwise reference its child nodes. A child node with no child nodes of its own is called a leaf node. Entries in the leaf nodes 306 point to or otherwise reference specific data nodes 318, or specific data objects 320 stored within specific data nodes 318, which may be stored in non-volatile memory such as storage medium 132.

In some embodiments, non-volatile memory is organized into groups of fixed size segments (e.g., segments 324-1, 324-2 through 324-p). Each segment is further partitioned into a group of fixed size slabs. All the slabs within a particular segment have the same size (e.g., segment 324-1 is a 2 kB slab segment). Optionally, a variety of slab sizes are supported by dividing the full set of segments into groups, with a different slab size for each group. In some embodiments, data object 320 is stored in a slab within a segment. Such a situation is depicted in FIG. 3, wherein data object 320 is stored in a 2 kB slab of segment 324-1 in storage medium 132.

In some embodiments, various portions of the tiered data structure 300 are cached in volatile memory (e.g., in DRAM). For example, in one embodiment, all of the internal nodes 304 are cached, but only a portion of the leaf nodes 306 are cached. In another embodiment, all of the internal nodes 304, and none of the leaf nodes 306 are cached. In some embodiments, the portion of the leaf nodes that is cached is determined by how frequently the corresponding data objects are accessed. For example, leaf nodes corresponding to data objects accessed more frequently than other data objects, by a predefined margin, are added to the portion of the leaf nodes that are cached, and leaf nodes corresponding to data objects that are accessed less frequently than other data objects, by a predefined margin, are removed from or not added to the cache. The caching of portions of the tiered data structure can help reduce the number of I/O operations required to perform data access operations, for example by avoiding additional I/O operations to access nodes stored in storage medium 132 in storage device 120.

In some embodiments, each node (i.e., root node 302, internal nodes 304, and leaf nodes 306) of the tiered data structure 300 has a corresponding logical ID, which is used to access the node using a hash table (e.g., secondary mapping table 230-1, FIG. 2A). The hash table is used to translate the logical ID of a node to its physical location in non-volatile memory. In some embodiments, when a respective node (e.g., leaf node 306) is modified, the updated or modified node is written to a different physical location, and the hash table is updated without changing the nodes above the modified node (e.g., leaf node 306-1 is modified and internal node 304-1 and root node 302 are not updated). The nodes above the modified node do not need to be modified because the logical ID of the modified node remains unchanged, and thus the content of the parent of the modified node, which includes the logical ID of the modified node, is not affected by the modification of the respective node. Updating the hash table without modifying the internal and root nodes avoids additional I/O operations. Further, updating the hash table without modifying the internal and root nodes decreases writes to the non-volatile memory and thus decreases write-amplification.

A leaf node 306 may store a variable number of keys and values. Often included amongst these keys and values are data object keys 310, data object pointers 312, attribute keys 314 (e.g., attribute key 314a-314b), and attribute values 316 (e.g., attribute value 316a-316b). Attribute values are sometimes herein called attributes, for ease of discussion. Furthermore, in some embodiments, an attribute, or attribute value, comprises both an attribute identifier (e.g., identifying a type of attribute) and a value (e.g., "color, red," where "color" is the attribute identifier, and "red" is the value). However, the present discussion is applicable without regard to the exact form or content of such attributes.

Each key/value pair in a leaf node is sometimes herein called an entry or tree entry 308 (e.g., tree entry 308a-308c). In some embodiments, keys are used to uniquely identify an entity, such as a data object or attribute, and thus the key in each tree entry 308 typically has a different value from the key in every other tree entry. Data object pointers 312 point to data objects 320 that may be stored within non-volatile memory (e.g., information in data object pointers 312 includes addresses to physical locations within the non-volatile memory). In some embodiments, attributes include source information, date information, or the like for particular data objects. A data object 320 may have any number of attributes associated with the data object.

Attribute values 316 are typically much smaller than their associated data objects. In some embodiments, when an attribute value meets (e.g., is smaller than) a predefined attribute size threshold, the attribute and its associated key are stored as a tree entry in a leaf node, and otherwise the attribute value is stored in a data node pointed to by a respective tree entry 308 in a leaf node. Similarly, in some embodiments, when a data object meets (e.g., is smaller than) a predefined object size threshold, the object and its key are stored as a tree entry in a leaf node. In FIG. 3, object pointer 312 would be replaced with the data object itself when the data object meets the predefined object size threshold.

As noted above, an attribute key 314 and its associated attribute value 316 (e.g., attribute one key 314a and attribute one value 316a) are called sometimes called a key/value pair 308. A data object key 310 and its associated data object pointer 312 also constitute a key/value pair. Individual key/value pairs 308 are typically stored contiguously within the leaf node into which they are placed. For example, data object key 310 and data object pointer 312 are stored as tree entry 308a, which occupies a contiguous portion or block 321 (contiguous portion 321a in this example) of a respective leaf node 306 (node 306-2 in this example). Similarly, tree entry 308b is stored in contiguous portion 321b of leaf node 306-3, and tree entry 308c is stored in contiguous portion 321c of leaf node 306-m.

FIGS. 4A-4B illustrate conceptual flow charts representations of methods of managing a data storage system, in accordance with some embodiments. More specifically, FIGS. 4A-4B represent simplified, conceptual flow charts of write and read operations to and from a non-volatile memory device, such as flash memory, employing a tiered data structure.

FIG. 4A illustrates a conceptual flow chart representation of a write data operation performed within a data storage system (e.g., data storage system 100, FIG. 1) having a tiered data structure (e.g., tiered data structure 300, FIG. 3), in accordance with some embodiments. With reference to the data storage system 100 depicted in FIG. 1, in some embodiments, a method 400a is performed at a computer system (e.g., computer system 110). In some embodiments, the method 400a is governed by instructions that are stored in a non-transitory computer-readable storage medium and that are executed by one or more processors of a host system, such as the one or more processing units (CPUs) 202 of computer system 110 (FIG. 2A). In some embodiments, the operations of method 400a are performed by executable software (e.g., device driver 216) that exists within a non-transitory computer-readable storage medium, such as memory 206-1 (FIG. 2A).

In some embodiments, some of the operations (or alternatively, steps) of method 400a are performed by a storage device (e.g., storage device 120), or one or more components of the storage device (e.g., storage controller 124), that is operatively coupled with the storage device and other operations of method 400a are performed at the host system. In some of these embodiments, the method 400a is governed, at least in part, by instructions that are stored in a non-transitory computer-readable storage medium and that are executed by one or more processors of a device, such as the one or more processing units (CPUs) 122 of management module 121 (FIG. 2B).

For ease of explanation, the following describes method 400a as performed by the host system (e.g., by CPUs 202 and device driver 216 of computer system 110, FIG. 2A). With reference to FIG. 2A, in some embodiments, the operations of method 400a are performed, at least in part, by a receiving module (e.g., receiving module 218-1); a write module (e.g., write module 220-1); a read module (e.g., read module 222-1); a tiered data structure access module (e.g., tiered data access module 224-1); within the tiered data structure access module, an access module (e.g., access module 228-1), and a secondary mapping table (e.g., secondary mapping table 230-1); a cache (e.g., cache 234-1); and within the cache, a cache lookup table (e.g., cache lookup table 236-1), and cached portions of tiered data structure (e.g., cached portions of tiered data structure 238-1).

Method 400a begins, in some embodiments, when the host system (e.g., computer system 110, FIG. 1, or a component thereof, such as device driver 216, FIG. 2A) requests to access a data object (e.g., data object 320, FIG. 3) within a tiered data structure (e.g., tiered data structure 300, FIG. 3). In some embodiments, the host system initiates 402a a write data operation. In some embodiments, initiating 402a the write data operation includes specifying the data object. In some embodiments, initiating 402a the write data operation includes specifying the data object and the attributes associated with the data object. In some embodiments, initiating 402a the write data operation includes requesting that the data object be stored in a data storage device (e.g., storage device 120, FIG. 1). In some embodiments, initiating 402a the write data operation includes specifying a data storage device (e.g., storage device 120, FIG. 1) to which the data object is to be written.

After initiating 402a the write data operation, the host system (e.g., computer system 110, FIG. 1, or a component thereof, such as device driver 216, FIG. 2A) determines 404 if an entry (e.g., entry 308*a*, FIG. 3) for the requested data object already exists within the tiered data structure 300. In some embodiments, entries for data objects are stored at multiple levels of the tiered data structure. In some embodiments, an entry for the data object is stored in a non-volatile storage medium (e.g., storage medium 132, FIG. 1). In some embodiments, determining 404 if an entry for the data object already exists (i.e., is already stored) within the tiered data structure includes reading tree entries within multiple levels of the tiered data structure in order to determine if there is a node in the tiered data structure that contains an entry for the data object.

In some embodiments, the determination operation 404 is performed by "traversing" the tiered data structure, as follows. The data object is typically identified by a data object key, and that data object key is used to traverse the tiered data structure until either a leaf node is located, or it is determined that no such data object is stored in the tiered data structure. Assuming the data object is stored in the tiered data structure, starting at the root node (302, FIG. 3), the logical ID of a next lower node is identified using the data object key. Typically, all the non-leaf nodes are cached, and the cached version of the next lower node is located within the cache (e.g., cache 234-1, FIG. 2A) by looking up the logical ID of that node in the cache's cache lookup table (e.g., cache lookup table 236-1, FIG. 2A). Stated another way, the tiered data access module locates an entry in the cache lookup table mapping the logical ID to a cached node, and then accesses the cached node to enable the traversal of the tiered data structure to continue. If the logical ID of the next lower node is not found in the cache lookup table (e.g., because the next lower node is an un-cached leaf node), the logical ID is mapped by the tiered data access module to a storage location (e.g., in storage medium 132) using the secondary mapping table (e.g., table 230-1, FIG. 2A). The next lower node, which may be a leaf node, is obtained by accessing the storage location. If the next lower node is not a leaf node, this process repeats. The tiered data structure traversal continues until either a leaf node with an entry for the data object is found, or it is determined that the tiered data structure does not contain an entry for the data object.

In some embodiments, if an entry for the data object already exists within the tiered data structure (i.e., 406—"yes"), the existing version of the requested data object (e.g., data object 320, FIG. 3) is invalidated 408. This is typically done because the existing version of the requested data object will be replaced with a new version. However, in some embodiments, the existing version of the requested data object is invalidated after the new version of the data object is stored in the tiered data structure (e.g., after operation 412).

In some embodiments, invalidating 408 the existing version of the data object includes deleting the existing version of the data object, or alternatively marking the existing version of the data object as invalid, which eventually results in the existing version of the data object being erased from a data node (e.g., data node 318, FIG. 3) from a non-volatile storage medium (e.g., storage medium 132, FIG. 1). In some embodiments, invalidating 408 the existing version of the data object includes deleting the tree entries (e.g., tree entries 308*a*-308*c*, FIG. 3) associated with the existing version of the data object, or alternatively marking those tree entries as invalid. In yet some other embodiments in which old values of an object and/or its attributes are part of a snapshot, the old values are not deleted until the corresponding snapshot is deleted. In such embodiments, the old values of objects and object attributes are differentiated from newer values of the objects and object attributes by associating version numbers with the corresponding leaf node entries. Typically, access to the old versions of objects and attributes is prevented during normal data processing operations. Furthermore, typically, access to the old versions of objects and attributes is enabled only when performing predefined operations associated with corresponding snapshots.

In some embodiments, method 400*a* continues by storing 410 the requested data object at an allocated physical location in a storage device (e.g., data object 320 is stored in a 2 kB slab of segment 324-1 in storage medium 132, FIG. 3). In some embodiments, the physical location is allocated using a slab-based technique in which non-volatile memory is organized into a group of large, fixed size segments. Each segment is further partitioned into a group of fixed size slabs. All the slabs within a particular segment have the same size (e.g., 2 kB slabs in segment 324-1, FIG. 3). A variety of slab sizes can be supported by dividing the full set of segments into groups, with a different slab size for group. In one example, 1 TB of storage is partitioned into 32 k×32 MB segments. The 32 k segments are divided into 15 groups supporting slab sizes of 512 B, 1 kB, 2 kB, . . . 4 MB, and 8 MB.

In some embodiments, a bit vector is associated with each segment, with 1 bit per slab in the segment. If a bit is set, the corresponding slab has been allocated, otherwise it is free. In some embodiments, allocating a slab of a particular size includes: (1) finding a segment that contains slabs of the desired size, (2) searching the bit vector for that segment to find a free slab, (3) setting the bit for the free slab, and (4) returning the location of the free slab. In some embodiments, the slab-based technique includes garbage collection mechanisms to redistribute the number of segments allocated per slab size. For example, allocations of 2 kB slab segments are increased while allocations of 16 kB slab segments are decreased, in response to a distribution of data objects changing to mostly smaller data objects. In some embodiments, the bit vectors are kept in DRAM, and after a crash or shutdown the bit vectors are reconstructed by scanning the tiered data structure to identify all slabs that are in use. In another embodiment, the bit vectors are written to non-volatile memory in a periodic manner, and reloaded into volatile memory during restart. Further, the most recent changes to the bit vectors are kept in a persisted log that is used to reconstruct the bit vectors during restart.

In some embodiments, the requested data object is stored in a non-volatile storage medium (e.g., storage medium 132, FIG. 1). In some embodiments, the requested data object is stored within a leaf node (e.g., leaf node 306-2, FIG. 3). In some embodiments, prior to storing the data object, the data object is encoded with an error correction information (sometimes called an error control code or error correction code), such as Hamming, Reed-Solomon (RS), Bose Chaudhuri Hocquenghem (BCH), or low-density parity-check (LDPC) to produce encoded data (e.g., one or more codewords).

After (or, more generally, in conjunction with) storing 410 the requested data object at an allocated physical location in a storage device, the data object attributes associated with the requested data object are stored 412 in the tiered data structure. In some embodiments, the attributes associated with the requested data object are stored in a non-volatile storage medium (e.g., storage medium 132, FIG. 1).

After (or, more generally, in conjunction with) storing 410 the requested data object at an allocated physical location in a storage device (and, optionally, after storing 412 the requested data object attributes in the tiered data structure), a secondary mapping table is updated 414. In some embodiments, the secondary mapping table is updated for each leaf node that is modified by the write data operation and written to a new location in storage medium 132. In particular, the secondary mapping table is updated to map the logical IDs of those leaf nodes to the new locations of the modified leaf nodes.

In some embodiments, the secondary mapping table is stored in volatile memory (e.g., dynamic random-access memory (DRAM)). In some embodiments, the secondary mapping table is continuously written to non-volatile memory in a periodic manner so that there is always a complete but "stale" version of the secondary mapping table. Additionally, the most recent changes to the secondary mapping table are kept in a persisted log that is used to bring the stale copy up-to-date during recovery from a crash or shutdown.

Additional details concerning each of the processing steps for method 400a, as well as details concerning additional processing steps, are presented below with reference to FIGS. 5A-5D.

FIG. 4B illustrates a conceptual flow chart representation of a read data operation performed within a data storage system (e.g., data storage system 100, FIG. 1) having a tiered data structure (e.g., tiered data structure 300, FIG. 3), in accordance with some embodiments. With reference to the data storage system 100 depicted in FIG. 1, in some embodiments, a method 400b is performed at a computer system (e.g., computer system 110). In some embodiments, the method 400b is governed by instructions that are stored in a non-transitory computer-readable storage medium and that are executed by one or more processors of a host system, such as the one or more processing units (CPUs) 202 of computer system 110 (FIG. 2A). In some embodiments, the operations of method 400b are performed by executable software (e.g., device driver 216) that exists within a non-transitory computer-readable storage medium, such as memory 206-1 (FIG. 2A).

In some embodiments, some of the operations (or alternatively, steps) of method 400b are performed by a storage device (e.g., storage device 120), or one or more components of the storage device (e.g., storage controller 124), that is operatively coupled with the storage device and other operations of method 400b are performed at the host system. In some of these embodiments, the method 400b is governed, at least in part, by instructions that are stored in a non-transitory computer-readable storage medium and that are executed by one or more processors of a device, such as the one or more processing units (CPUs) 122 of management module 121 (FIG. 2B).

For ease of explanation, the following describes method 400b as performed by the host system (e.g., by CPUs 202 and device driver 216 of computer system 110, FIG. 2A). With reference to FIG. 2A, in some embodiments, the operations of method 400b are performed, at least in part, by a receiving module (e.g., receiving module 218-1); a read module (e.g., read module 222-1); a tiered data structure access module (e.g., tiered data access module 224-1); a secondary mapping table (e.g., secondary mapping table 230-1); a cache (e.g., cache 234-1); and within the cache, a cache lookup table (e.g., cache lookup table 236-1), and cached portions of tiered data structure (e.g., cached portions of tiered data structure 238-1).

The method 400b begins, in some embodiments, when the host system (e.g., computer system 110, FIG. 1, or a component thereof, such as device driver 216, FIG. 2A) requests to access a data object (e.g., data object 320, FIG. 3) within a tiered data structure (e.g., tiered data structure 300, FIG. 3). In some embodiments, the host system, or an application (e.g., application 212) of the host system, initiates 402b a read data operation. In some embodiments, initiating 402b the read data operation includes selecting or specifying the data object. In some embodiments, initiating 402b the read data operation includes selecting or specifying the data object and the attributes associated with the data object. In some embodiments, initiating 402b the read data operation includes requesting that the data object be read from a data storage device (e.g., storage device 120, FIG. 1). In some embodiments, initiating 402b the read data operation includes specifying a data storage device (e.g., storage device 120, FIG. 1) from which the data object is to be read.

After initiating 402b the read data operation, an entry for the requested data object is located 416 in the tiered data structure. In some embodiments, the entry for the requested data object is located in cached portions of the tiered data structure (e.g., cached portions of tiered data structure 238-1, FIG. 2A). In some embodiments, the entry for the requested data object is not located in cached portions of the tiered data structure, and the entry for the requested data object is located in non-volatile memory. Furthermore, in some embodiments, locating the entry for the data object is accomplished using the tiered data structure traversal process described above with respect to operation 404 of method 400a. It is noted that while traversing the tiered data structure, a logical ID of the leaf node having the entry for the requested data object is determined 418 from an entry in the tiered data structure, and more specifically from an entry in a parent node of the leaf node.

The method 400b continues, after locating the entry for the requested data object, with determining the physical location of a leaf node corresponding to the requested data object. In some embodiments, the physical location of the leaf node is determined 420 using a secondary mapping table to translate the logical ID of the leaf node to a physical location. In some embodiments, the secondary mapping table is a hash table having an associated hash function that is used to hash the logical ID of the leaf node to locate an entry in the secondary mapping table that contains or identifies the physical location of the leaf node.

After determining 420 the physical location of a leaf node corresponding to the requested data object, the leaf node is read 422 to determine the physical location of the requested data object. In some embodiments, reading the leaf node returns a leaf node map entry which includes the size and physical location of the requested data object. In some embodiments, the leaf node map entry includes the logical ID for the leaf node. In some embodiments, the leaf node map entry includes key information for the data object to enable the leaf node map entry to be found in the leaf node. For example, in some embodiments, if a leaf node contains a plurality of leaf node map entries, the key information for the data object is used to obtain the corresponding leaf node map entry.

The method 400b continues, after the leaf node is read 420 to determine the physical location of the requested data object, with reading 424 the requested data object using the physical location determined from the leaf node. In some embodiments or in some circumstances (e.g., when the requested data object is smaller than a predefined threshold size), the requested data object is read 424 from a leaf node (e.g., leaf node 306-2, FIG. 3). In some embodiments, the requested data object is read 424 from one or more data nodes that are stored within a non-volatile storage medium (e.g., storage medium 132, FIG. 1). In some embodiments, the requested data object, upon being read, is sent to the requesting host or requesting application (e.g., application 212, FIG. 2A). In some embodiments, reading 424 the requested data object includes decoding the accessed data stored within the tiered data structure. For example, as described above, the data object may have been encoded with error correction information prior to it being stored in a data node in the tiered data structure, and when that data object is read from the tiered data structure, the obtained data object is decoded to produce decoded data suitable for being sent to the requesting host or requesting application. The decoding process also corrects any errors in the requested data object, so long as the number of such errors are within the error correction power of the error control code that was used to encode the requested data object. In some embodiments, reading 424 the requested data object includes decrypting the accessed data stored within the tiered data structure. For example, the data object may have been encrypted prior to it being stored in a data node in the tiered data structure, and when that data object is read from the tiered data structure, the obtained data object is decrypted to produce data suitable for being sent to the requesting host or requesting application.

In some embodiments a read data operation requires two I/O operations (e.g., two operations accessing nodes stored in storage medium 132 in storage device 120), while requiring less than 0.1% of volatile memory (cache) relative to non-volatile memory. For example, for 1 TB of non-volatile storage, less than 1 GB of volatile memory is required to cache all but the leaf nodes of the tiered data structure and the secondary mapping table. In that example, the first I/O operation is required to read the required leaf node from the storage device, after determining its physical location using the cached parent nodes and secondary mapping table, and the second I/O operation is required to read the requested data object from the storage device. In some embodiments, for example larger non-volatile storage systems (e.g., 1 PB), the amount of volatile memory needed to store cached parent nodes and the secondary mapping table, which enables performing just two I/O operations per read data operation, is less than 0.03% of the amount of non-volatile memory. Thus for a 1 PB storage system, the amount of volatile memory needed to store cached parent nodes and the secondary mapping table is typically less than 300 GB.

Additional details concerning each of the processing steps for method 400a, as well as details concerning additional processing steps, are presented below with reference to FIGS. 5A-5D.

FIGS. 5A-5D illustrate a flowchart representation of a method of managing a data storage system employing a tiered data structure, in accordance with some embodiments. With reference to the data storage system 100 depicted in FIG. 1, in some embodiments, a method 500 is performed at a computer system (e.g., computer system 110). In some embodiments, the method 500 is governed by instructions that are stored in a non-transitory computer-readable storage medium and that are executed by one or more processors of a host system, such as the one or more processing units (CPUs) 202 of computer system 110 (FIG. 2A). In some embodiments, the operations of method 500 are performed by executing software (e.g., device driver 216) stored in a non-transitory computer-readable storage medium, such as memory 206-1 (FIG. 2A).

In some embodiments, some of the operations (or alternatively, steps) of method 500 are performed by a storage device (e.g., storage device 120), or one or more components of the storage device (e.g., storage controller 124), that is operatively coupled with the storage device and other operations of method 500 are performed at the host system. In some of these embodiments, the method 500 is governed, at least in part, by instructions stored in a non-transitory computer-readable storage medium and that are executed by one or more processors of a device, such as the one or more processing units (CPUs) 122 of management module 121 (FIG. 2B).

For ease of explanation, the following describes method 500 as performed by the host system (e.g., by CPUs 202 and device driver 216 of computer system 110, FIG. 2A). With reference to FIG. 2A, in some embodiments, the operations of method 500 are performed, at least in part, by a receiving module (e.g., receiving module 218-1, FIG. 2A); a write module (e.g., write module 220-1, FIG. 2A); a read module (e.g., read module 222-1); a tiered data structure access module (e.g., tiered data access module 224-1); within the tiered data structure access module, an access module (e.g., access module 228-1), and a secondary mapping table (e.g., secondary mapping table 230-1); a cache (e.g., cache 234-1); and within the cache, a cache lookup table (e.g., cache lookup table 236-1), and cached portions of tiered data structure (e.g., cached portions of tiered data structure 238-1).

With reference to FIGS. 5A-5D, the host system (e.g., computer system 110, or a component thereof, such as device driver 216, FIG. 2A) manages 502 a storage system (e.g., data storage system 100, FIG. 1) having a plurality of storage devices (e.g., NVM devices 134 in storage device 120, FIG. 1). Method 500 includes detecting 504 a first request to perform a read operation of a first data object stored in a storage device of the storage system, wherein the first request includes first key information corresponding to the first data object. In some embodiments, the storage device includes 506 one or more flash memory devices.

In some embodiments, after detecting a first request to perform a read operation, the method includes locating 508 a first entry for the first key information in a tiered data structure, wherein the first entry includes a logical ID for a leaf node corresponding to the first key information, as explained above with reference to FIG. 4B (416 and 418). In some embodiments, the tiered data structure includes 510 a plurality of internal nodes and a plurality of leaf nodes. Further, in some embodiments, each leaf node of the plurality of leaf nodes corresponds 512 to at least one data object. In some embodiments, a respective leaf node of the plurality of leaf nodes includes 514 metadata for a corresponding data object. For example, the metadata includes one or more attribute values for the data object, for attributes such as file owner, created date, last modified date, etc. In some embodiments, the metadata includes key/value pairs, with keys that are adjacent to the key for the data object in the sort order, but in other embodiments, the key/value pairs in the metadata have independently assigned keys and thus have tree entries (e.g., 308b, 308c in FIG. 3) in whichever leaf nodes are associated with those keys. In some embodiments, the metadata are small enough to fit in the leaf node, in which case a single read operation is needed to read each key/value pair of the metadata, instead of two read operations (e.g., one for the leaf node for the associated tree entry and one for the data object in which the attribute value is stored).

In some embodiments, the plurality of internal nodes (e.g., Nodes 302, 304-1-304-L, FIG. 3) are cached 516 in a volatile memory cache. Further, in some embodiments, locating the first entry for the first key information in the tiered data structure includes obtaining 518 from a respective internal node of the tiered data structure a respective logical ID for another internal node of the tiered data structure that includes the first entry, and searching the volatile memory cache for the another internal node of the tiered data structure using the respective logical ID. For example, referring to FIG. 3, the method includes, while traversing tiered data structure 300, obtaining the logical ID of the internal node (e.g., node 304-1) that is a parent of the leaf node (e.g., leaf node 306-2) having the first entry, and obtaining the logical ID of the leaf node from an entry in the internal node. Furthermore, in this example, secondary mapping table 230 is used to translate those logical IDs into physical locations of the corresponding nodes. In some embodiments, determining the first physical location of the leaf node includes searching 520 the volatile memory cache for the logical ID for the leaf node, and upon confirming that the volatile memory cache does not have a cached node corresponding to the logical ID for the leaf node, using the secondary mapping table to determine the first physical location of the leaf node based on the logical ID for the leaf node.

In some embodiments, after locating a first entry for the first key information in a tiered data structure, method 500 includes determining 522 a first physical location of the leaf node based on the logical ID for the leaf node using a secondary mapping table, wherein the secondary mapping table is used to translate logical IDs for leaf nodes to physical locations of leaf nodes, as explained above with reference to FIG. 4B (420). Further, in some embodiments, the secondary mapping table is stored 524 in a dynamic random-access memory (DRAM).

In some embodiments, method 500 continues by reading 526 the leaf node using the first physical location to obtain a leaf node map entry, wherein the leaf node map entry includes size of the first data object and a second physical location of the first data object. Further, method 500 includes, after determining the second physical location of the first data object, reading 528 from the second physical location to obtain the first data object.

In some embodiments, managing 502 a storage system having a plurality of storage devices is controlled by a host that includes 530 a client on behalf of which data is stored in the storage system (e.g., data storage system 100, FIG. 1). In some embodiments, the client is or includes an entity on behalf of which data is stored in the storage system. For example, in some embodiments, the host is computer system 110 (FIG. 1) or a client process, module or application executed by computer system 110.

In some embodiments, the host includes 532 a storage system controller of the storage system. In some embodiments, the storage system controller controls and/or coordinates operations among one or more storage devices (e.g., data storage device 120, FIG. 1). In some embodiments, the storage system controller is an entity with processing power closest to the storage device. For example, in some embodiments, in some storage systems, the host is an intermediary node between one or more storage devices and a client.

In some embodiments, the host includes 534 a cluster controller of the storage system. In some embodiments, the cluster controller controls and/or coordinates operations among one or more data storage subsystems, where each of the data storage subsystems may be implemented as a data storage system having one or more storage devices (e.g., data storage device 120, FIG. 1). In some embodiments, the cluster controller is an entity with processing power between a client system and the storage device.

In some embodiments, method 500 includes 536 detecting a second request to perform a write operation for a second data object to the storage device of the storage system, wherein the second request includes data to be written for the second data object and second key information corresponding to the second data object. Next, the method includes determining 538 whether a second entry for the second key information is in the tiered data structure, as explained above with reference to FIG. 4A (404).

In some embodiments, in accordance with a determination 540 that the second entry for the second key information is not in the tiered data structure, method 500 further includes: (1) allocating 542 space at a third physical location in the storage device for the data to be written for the second data object; (2) writing 544 the data to be written for the second data object to the third physical location; and (3) inserting 548 the second entry for the second key information in the tiered data structure, wherein the second entry includes size of the second data object and the third physical location.

In some embodiments, in accordance with a determination 550 that the second entry for the second key information is in the tiered data structure, method 500 further includes: (1) invalidating 552 data previously associated with the second data object; (2) allocating 554 space at a third physical location in the storage device for the data to be written for the second data object; (3) writing 556 the data to be written for the second data object to the third physical location; and (4) updating 558 the second entry for the second key information in the tiered data structure to include the size (e.g., a new size) of the second data object and the third physical location. In some embodiments, an error is returned to the host system if the second data object cannot be overwritten. In some embodiments, the invalidated data is garbage collected after the second data object is written to the third physical location.

If an entry for the second key information is not already stored in the tiered data structure (when the write operation is not an overwrite operation), the second entry for the second key information is a new entry. On the other hand, if an entry for the second key information is already stored in the tiered data structure (when the write operation is an overwrite operation), the second entry is modified in accordance with the location (and optionally the size) of the written data.

In some embodiments, writing the data to be written for the second data object to the third physical location includes concurrently updating 546 a leaf node, in the tiered data structure, corresponding to the second data object to include metadata for the second data object.

In the case where the metadata, for example an attribute value, represented by a key/value pair, is small enough to fit in a leaf node, it is possible to store the key/value pair with a single update to the tiered data structure, by storing the key and its value in the leaf node. In the case where the metadata are too large to fit in the leaf node with the leaf node map entry for the data object, the leaf node includes pointers to the data blocks in which the metadata is stored, and thus two I/O operations are required to write the key/value pair, one for writing the associated tree entry and one for writing the data object in which the attribute value is stored.

While the above descriptions focus on the use of logical IDs and a secondary mapping table to make read and write operations efficient in terms of the number of I/O operations required, similar efficiencies are obtained when performing other types of operations, including delete operations, existence checking operations, nameless writes, range queries, enumeration queries, and the like.

With respect to storage medium 132 (FIG. 1), it is noted that semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Furthermore, each type of memory device may have different configurations. For example, flash memory devices may be configured in a NAND or a NOR configuration.

The memory devices can be formed from passive elements, active elements, or both. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles or a charge storage dielectric material.

Multiple memory elements may be configured so that they are connected in series or such that each element is individually accessible. By way of non-limiting example, NAND devices contain memory elements (e.g., devices containing a charge storage region) connected in series. For example, a NAND memory array may be configured so that the array is composed of multiple strings of memory in which each string is composed of multiple memory elements sharing a single bit line and accessed as a group. In contrast, memory elements may be configured so that each element is individually accessible (e.g., a NOR memory array). One of skill in the art will recognize that the NAND and NOR memory configurations are exemplary, and memory elements may be otherwise configured.

The semiconductor memory elements included in a single device, such as memory elements located within and/or over the same substrate or in a single die, may be distributed in a two- or three-dimensional manner (such as a two dimensional (2D) memory array structure or a three dimensional (3D) memory array structure).

In a two dimensional memory structure, the semiconductor memory elements are arranged in a single plane or single memory device level. Typically, in a two dimensional memory structure, memory elements are located in a plane (e.g., in an x-z direction plane) which extends substantially parallel to a major surface of a substrate that supports the memory elements. The substrate may be a wafer on which the material layers of the memory elements are deposited and/or in which memory elements are formed or it may be a carrier substrate which is attached to the memory elements after they are formed.

The memory elements may be arranged in the single memory device level in an ordered array, such as in a plurality of rows and/or columns. However, the memory elements may be arranged in non-regular or non-orthogonal configurations as understood by one of skill in the art. The memory elements may each have two or more electrodes or contact lines, including a bit line and a word line.

A three dimensional memory array is organized so that memory elements occupy multiple planes or multiple device levels, forming a structure in three dimensions (i.e., in the x, y and z directions, where the y direction is substantially perpendicular and the x and z directions are substantially parallel to the major surface of the substrate).

As a non-limiting example, each plane in a three dimensional memory array structure may be physically located in two dimensions (one memory level) with multiple two dimensional memory levels to form a three dimensional memory array structure. As another non-limiting example, a three dimensional memory array may be physically structured as multiple vertical columns (e.g., columns extending substantially perpendicular to the major surface of the substrate in the y direction) having multiple elements in each column and therefore having elements spanning several vertically stacked planes of memory devices. The columns may be arranged in a two dimensional configuration (e.g., in an x-z plane), thereby resulting in a three dimensional arrangement of memory elements. One of skill in the art will understand that other configurations of memory elements in three dimensions will also constitute a three dimensional memory array.

By way of non-limiting example, in a three dimensional NAND memory array, the memory elements may be connected together to form a NAND string within a single plane, sometimes called a horizontal (e.g., x-z) plane for ease of discussion. Alternatively, the memory elements may be connected together to extend through multiple parallel planes. Other three dimensional configurations can be envisioned wherein some NAND strings contain memory elements in a single plane of memory elements (sometimes called a memory level) while other strings contain memory elements which extend through multiple parallel planes (sometimes called parallel memory levels). Three dimensional memory arrays may also be designed in a NOR configuration and in a ReRAM configuration.

A monolithic three dimensional memory array is one in which multiple planes of memory elements (also called multiple memory levels) are formed above and/or within a single substrate, such as a semiconductor wafer, according to a sequence of manufacturing operations. In a monolithic 3D memory array, the material layers forming a respective memory level, such as the topmost memory level, are located on top of the material layers forming an underlying memory level, but on the same single substrate. In some implementations, adjacent memory levels of a monolithic 3D memory array optionally share at least one material layer, while in other implementations adjacent memory levels have intervening material layers separating them.

In contrast, two dimensional memory arrays may be formed separately and then integrated together to form a non-monolithic 3D memory device in a hybrid manner. For example, stacked memories have been constructed by forming 2D memory levels on separate substrates and integrating the formed 2D memory levels atop each other. The substrate of each 2D memory level may be thinned or removed prior to integrating it into a 3D memory device. As the individual memory levels are formed on separate substrates, the resulting 3D memory arrays are not monolithic three dimensional memory arrays.

Further, more than one memory array selected from 2D memory arrays and 3D memory arrays (monolithic or hybrid) may be formed separately and then packaged together to form a stacked-chip memory device. A stacked-chip memory device includes multiple planes or layers of memory devices, sometimes called memory levels.

The term "three-dimensional memory device" (or 3D memory device) is herein defined to mean a memory device having multiple layers or multiple levels (e.g., sometimes called multiple memory levels) of memory elements, including any of the following: a memory device having a monolithic or non-monolithic 3D memory array, some non-limiting examples of which are described above; or two or more 2D and/or 3D memory devices, packaged together to form a stacked-chip memory device, some non-limiting examples of which are described above.

A person skilled in the art will recognize that the invention or inventions described and claimed herein are not limited to the two dimensional and three dimensional exemplary structures described here, and instead cover all relevant memory structures suitable for implementing the invention or inventions as described herein and as understood by one skilled in the art.

It will be understood that, although the terms "first," "second," etc. may be used herein to describe various elements, these elements should not be limited by these terms. These terms are only used to distinguish one element from another. For example, a first target charge could be termed a second target charge, and, similarly, a second target charge could be termed a first target charge, without changing the meaning of the description, so long as all occurrences of the "first target charge" are renamed consistently and all occurrences of the "second target charge" are renamed consistently. The first target charge and the second target charge are both target charges, but they are not the same target charge.

The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description, for purpose of explanation, has been described with reference to specific embodiments. However, the illustrative discussions above are not intended to be exhaustive or to limit the claims to the precise forms disclosed. Many modifications and variations are possible in view of the above teachings. The embodiments were chosen and described in order to best explain principles of operation and practical applications, to thereby enable others skilled in the art.

What is claimed is:

1. A method of managing a storage system having one or more storage devices, the method comprising:
   detecting a first request to perform a read operation of a first data object stored in a storage device of the storage system, the first request including first key information corresponding to the first data object;
   locating a first entry for the first key information in a tiered data structure, the first entry including a first logical ID for a first leaf node corresponding to the first key information;
   determining a first physical location of the first leaf node based on the first logical ID for the first leaf node using a secondary mapping table, the secondary mapping table being used to translate logical IDs for leaf nodes to physical locations of leaf nodes;
   reading the first leaf node using the first physical location to obtain a leaf node map entry, the leaf node map entry including size of the first data object and a second physical location of the first data object;
   reading from the second physical location to obtain the first data object;
   receiving a second request to perform a write operation for a second data object to the storage device, the second request including second data to be written for the second data object and second key information corresponding to the second data object; and
   in accordance with a determination that a second entry for the second key information is in a second leaf node of the tiered data structure:
      accessing the second leaf node using the secondary mapping table, the second leaf node having (i) a second logical ID, (ii) a third physical location determined using the secondary mapping table, and (iii) a parent node in the tiered data structure; and
      modifying content of the second leaf node in accordance with the second request to perform a write operation for the second data object, including:
         writing the modified second leaf node to a fourth physical location different from the third physical location,
         updating a physical location corresponding to the second logical ID of the second leaf node in the secondary mapping table to the fourth physical location, while leaving unchanged the second logical ID of the second leaf node, to map the second logical ID of the second leaf node to the fourth physical location, and
         leaving unchanged the parent node of the second leaf node.

2. The method of claim 1, wherein:
   the tiered data structure includes a plurality of internal nodes and a plurality of leaf nodes; and
   the internal nodes of the tiered data structure and the secondary mapping table are stored in volatile memory.

3. The method of claim 2, wherein a portion of the leaf nodes in the tiered data structure are cached in a volatile memory cache.

4. The method of claim 3, wherein determining the first physical location of the first leaf node includes:
   searching the volatile memory cache for the second logical ID for the first leaf node; and
   upon confirming that the volatile memory cache does not have a cached node corresponding to the first logical ID for the first leaf node, using the secondary mapping table to determine the first physical location of the first leaf node based on the first logical ID for the first leaf node.

5. The method of claim 2, wherein each leaf node of the plurality of leaf nodes corresponds to at least one data object.

6. The method of claim 5, wherein a respective leaf node of the plurality of leaf nodes includes metadata for a corresponding data object.

7. The method of claim 2, wherein the leaf nodes in the tiered data structure are stored in non-volatile memory.

8. The method of claim 1, further comprising:
receiving a third request to perform a write operation for a third data object to the storage device of the storage system, wherein the third request includes third data to be written for the third data object and third key information corresponding to the third data object;
determining whether a third entry for the third key information is in the tiered data structure; and
in accordance with a determination that the third entry for the third key information is in the tiered data structure:
allocating space at a fifth physical location in the storage device for the third data to be written for the third data object;
writing the third data to be written for the third data object to the fifth physical location;
invalidating data previously associated with the third data object; and
updating the third entry for the third key information in the tiered data structure to include size of the third data object and a sixth physical location.

9. The method of claim 1, further comprising:
concurrently with writing the second data to be written for the second data object to the fourth physical location, updating the second leaf node, in the tiered data structure, corresponding to the second data object to include metadata for the second data object.

10. The method of claim 1, wherein the method is controlled by a host that includes a client on behalf of which data is stored in the storage system.

11. The method of claim 1, wherein the method is controlled by a host that includes a storage system controller of the storage system.

12. The method of claim 1, wherein the method is controlled by a host that includes a cluster controller of the storage system.

13. The method of claim 1, wherein the storage device comprises one or more flash memory devices.

14. A host system, comprising:
an interface for operatively coupling to a storage system having one or more storage devices;
one or more processors; and
controller memory storing one or more programs which, when executed by the one or more processors, cause the host system to perform operations comprising:
detecting a first request to perform a read operation of a first data object stored in a storage device of the storage system, the first request including first key information corresponding to the first data object;
locating a first entry for the first key information in a tiered data structure, the first entry including a first logical ID for a first leaf node corresponding to the first key information;
determining a first physical location of the first leaf node based on the first logical ID for the first leaf node using a secondary mapping table, the secondary mapping table being used to translate logical IDs for leaf nodes to physical locations of leaf nodes;
reading the first leaf node using the first physical location to obtain a leaf node map entry, the leaf node map entry including size of the first data object and a second physical location of the first data object;
reading from the second physical location to obtain the first data object;
receiving a second request to perform a write operation for a second data object to the storage device, the second request including second data to be written for the second data object and second key information corresponding to the second data object; and
in accordance with a determination that a second entry for the second key information is in a second leaf node of the tiered data structure:
accessing the second leaf node using the secondary mapping table, the second leaf node having (i) a second logical ID, (ii) a third physical location determined using the secondary mapping table, and (iii) a parent node in the tiered data structure; and
modifying content of the second leaf node in accordance with the second request to perform a write operation for the second data object, including:
writing the modified second leaf node to a fourth physical location different from the third physical location,
updating a physical location corresponding to the second logical ID of the second leaf node in the secondary mapping table to the fourth physical location, while leaving unchanged the second logical ID of the second leaf node, to map the second logical ID of the second leaf node to the fourth physical location, and
leaving unchanged the parent node of the second leaf node.

15. The host system of claim 14, wherein:
the tiered data structure includes a plurality of internal nodes and a plurality of leaf nodes; and
the internal nodes of the tiered data structure and the secondary mapping table are stored in volatile memory.

16. The host system of claim 15, wherein a portion of the leaf nodes in the tiered data structure are cached in a volatile memory cache.

17. The host system of claim 16, wherein the operations further comprise:
receiving a third request to perform a write operation for a third data object to the storage device of the storage system, wherein the third request includes third data to be written for the third data object and third key information corresponding to the third data object;
determining whether a third entry for the third key information is in the tiered data structure; and
in accordance with a determination that the third entry for the third key information is in the tiered data structure:
allocating space at a fifth physical location in the storage device for the third data to be written for the third data object;
writing the third data to be written for the third data object to the fifth physical location;
invalidating data previously associated with the third data object; and
updating the third entry for the third key information in the tiered data structure to include size of the third data object and the fifth physical location.

18. The host system of claim 16, wherein determining the first physical location of the first leaf node includes:

searching the volatile memory cache for the second logical ID for the first leaf node; and upon confirming that the volatile memory cache does not have a cached node corresponding to the first logical ID for the first leaf node, using the secondary mapping table to determine the first physical location of the first leaf node based on the first logical ID for the first leaf node.

19. The host system of claim 14, wherein the operations further comprise:

receiving a third request to perform a write operation for a third data object to the storage device of the storage system, wherein the third request includes third data to be written for the third data object and third key information corresponding to the third data object;

determining whether a third entry for the third key information is in the tiered data structure; and in accordance with a determination that the third entry for the third key information is in the tiered data structure:
  allocating space at a fifth physical location in the storage device for the third data to be written for the third data object;
  writing the third data to be written for the third data object to the fifth physical location;
  invalidating data previously associated with the third data object; and
  updating the third entry for the third key information in the tiered data structure to include size of the third data object and the fifth physical location.

20. A storage system, comprising:

one or more storage devices;

one or more subsystems having one or more processors; and memory storing one or more programs which, when executed by the one or more processors, cause the one or more subsystems to perform operations, the one or more subsystems comprising:

means for detecting a first request to perform a read operation of a first data object stored in a storage device of the storage system, the first request including first key information corresponding to the first data object;

means for locating a first entry for the first key information in a tiered data structure, the first entry including a first logical ID for a first leaf node corresponding to the first key information;

means for determining a first physical location of the first leaf node based on the first logical ID for the first leaf node using a secondary mapping table, the secondary mapping table being used to translate logical IDs for leaf nodes to physical locations of leaf nodes;

means for reading the first leaf node using the first physical location to obtain a leaf node map entry, the leaf node map entry including size of the first data object and a second physical location of the first data object;

means for reading from the second physical location to obtain the first data object;

means for receiving a second request to perform a write operation for a second data object to the storage device, the second request including second data to be written for the second data object and second key information corresponding to the second data object; and in accordance with a determination that a second entry for the second key information is in a second leaf node of the tiered data structure:
    means for accessing the second leaf node using the secondary mapping table, the second leaf node having (i) a second logical ID, (ii) a third physical location determined using the secondary mapping table, and (iii) a parent node in the tiered data structure; and
    means for modifying content of the second leaf node in accordance with the second request to perform a write operation for the second data object, including:
      means for writing the modified second leaf node to a fourth physical location different from the third physical location,
      means for updating a physical location corresponding to the second logical ID of the second leaf node in the secondary mapping table to the fourth physical location, and means for leaving unchanged the second logical ID of the second leaf node, to map the second logical ID of the second leaf node to the fourth physical location, and
      means for leaving unchanged the parent node of the second leaf node.

21. The storage system of claim 20, wherein the subsystems further comprise:

means for receiving a third request to perform a write operation for a third data object to the storage device of the storage system, wherein the third request includes third data to be written for the third data object and third key information corresponding to the third data object;

means for determining whether a third entry for the third key information is in the tiered data structure; and in accordance with a determination that the third entry for the third key information is in the tiered data structure:
  means for allocating space at a fifth physical location in the storage device for the third data to be written for the third data object;
  means for writing the third data to be written for the third data object to the fifth physical location;
  means for invalidating data previously associated with the third data object; and
  means for updating the third entry for the third key information in the tiered data structure to include size of the third data object and the fifth physical location.

* * * * *